United States Patent
Wang et al.

(10) Patent No.: US 12,299,215 B2
(45) Date of Patent: May 13, 2025

(54) MOUNTABLE TOOL COMPUTER INPUT

(71) Applicant: Apple Inc., Cupertino, CA (US)

(72) Inventors: Paul X. Wang, Cupertino, CA (US); Dinesh C. Mathew, San Francisco, CA (US); John S. Camp, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/403,556

(22) Filed: Jan. 3, 2024

(65) Prior Publication Data

US 2024/0152218 A1 May 9, 2024

Related U.S. Application Data

(63) Continuation of application No. 17/651,163, filed on Feb. 15, 2022, now Pat. No. 11,893,171, which is a continuation of application No. 16/789,173, filed on Feb. 12, 2020, now Pat. No. 11,275,455.

(51) Int. Cl.
| | |
|---|---|
| *G06F 3/0354* | (2013.01) |
| *G06F 3/01* | (2006.01) |
| *G06F 3/02* | (2006.01) |
| *G06F 3/038* | (2013.01) |
| *G06F 3/0485* | (2022.01) |

(52) U.S. Cl.
CPC .......... *G06F 3/03545* (2013.01); *G06F 3/016* (2013.01); *G06F 3/02* (2013.01); *G06F 3/03547* (2013.01); *G06F 3/038* (2013.01); *G06F 3/0485* (2013.01)

(58) Field of Classification Search
CPC ........ G06F 3/03545; G06F 3/016; G06F 3/02; G06F 3/03547; G06F 3/038; G06F 3/0485; G06F 2203/0339; G06F 3/0362
See application file for complete search history.

(56) References Cited

U.S. PATENT DOCUMENTS

| | | | |
|---|---|---|---|
| 4,712,101 A | 12/1987 | Culver | |
| 6,130,666 A | 10/2000 | Persidsky | |
| 9,116,560 B1 | 8/2015 | Habash | |
| 10,452,169 B2 | 10/2019 | Wang et al. | |
| 10,564,724 B1 | 2/2020 | Bergeron et al. | |
| 2009/0195499 A1 | 8/2009 | Griffin | |
| 2010/0085325 A1 | 4/2010 | King-Smith et al. | |
| 2014/0253463 A1 | 9/2014 | Hicks | |

(Continued)

FOREIGN PATENT DOCUMENTS

CN 202421939 U 9/2012

*Primary Examiner* — Jonathan A Boyd
(74) *Attorney, Agent, or Firm* — Dorsey & Whitney LLP

(57) ABSTRACT

Computing systems and input devices can include a chassis with a computing device and an input tool with a sensor, such as a pen- or rod-like input tool, that can be positioned relative to the chassis in multiple configurations. In one configuration, the tool can be spaced away from the chassis and its sensor output can cause a first output signal in response to input provided to the sensor. In another configuration, the tool can be contacting the chassis and its sensor output can cause a second output signal in response to input provided to the sensor. For example, an input tool can be stowed in a recess of a keyboard housing or device chassis, and the input tool can produce a first output when it is in the recess and a second input when it has been removed from the chassis.

20 Claims, 12 Drawing Sheets

(56) References Cited

U.S. PATENT DOCUMENTS

| | | |
|---|---|---|
| 2014/0253464 A1 | 9/2014 | Hicks et al. |
| 2014/0253469 A1 | 9/2014 | Hicks et al. |
| 2014/0313171 A1* | 10/2014 | Hong .................... G06F 3/0227 |
| | | 345/184 |
| 2015/0156290 A1 | 6/2015 | Amit et al. |
| 2016/0054821 A1* | 2/2016 | Kim ...................... G06F 3/0442 |
| | | 345/179 |
| 2016/0274761 A1 | 9/2016 | Alonso Ruiz et al. |
| 2017/0090572 A1 | 3/2017 | Holenarsipur et al. |
| 2017/0097698 A1 | 4/2017 | Maeshima |
| 2017/0205879 A1 | 7/2017 | Joseph et al. |
| 2017/0222456 A1 | 8/2017 | Perez et al. |
| 2019/0079584 A1 | 3/2019 | Bonanno et al. |
| 2020/0012358 A1 | 1/2020 | Marshall et al. |
| 2020/0050338 A1 | 2/2020 | Choi et al. |
| 2021/0099025 A1 | 4/2021 | Gaule et al. |
| 2022/0171474 A1 | 6/2022 | Wang et al. |

* cited by examiner

MOUNTABLE TOOL COMPUTER INPUT

CROSS-REFERENCE TO RELATED APPLICATIONS

This application is a continuation of U.S. patent application Ser. No. 17/651,163, filed 15 Feb. 2022, and entitled "MOUNTABLE TOOL COMPUTER INPUT," which is a continuation of U.S. patent application Ser. No. 16/789,173, filed 12 Feb. 2020, and entitled "MOUNTABLE TOOL COMPUTER INPUT," now U.S. Pat. No. 11,275,455, issued 15 Mar. 2022, the disclosures of which are incorporated herein in their entirety.

FIELD

The described embodiments relate generally to input device systems. More particularly, the present embodiments relate to input devices incorporating a stylus that is removably mounted to a keyboard or similar input device.

BACKGROUND

A variety of handheld input devices are used to detect user input. For example, a stylus is often used to provide input by contacting a digitizer or touch-sensitive panel of an electronic device. The touch panel may include a touch-sensitive surface that, in response to detecting a touch event, generates a signal that can be processed and used by other components of the electronic device. A display component of the electronic device may display textual and/or graphical display elements representing selectable virtual buttons or icons, and the touch sensitive surface may allow a user to navigate and change the content displayed on the display screen. Typically, a user can move one or more input devices, such as a stylus, across the touch panel in a pattern that the device translates into an input command. Some styluses can be touch- and force-sensitive to provide writing or drawing input to the electronic device. Functions of the stylus or electronic device can also be remotely controlled by interacting with a sensor on the stylus while the stylus is handheld.

SUMMARY

Aspects of the present disclosure relate to a computing system comprising a chassis, a computing device, and an input tool having a sensor, with the input tool being positionable relative to the chassis in a first configuration and in a second configuration. In the first configuration, the input tool can be spaced away from the chassis and the computing device can be configured to output a first signal in response to input provided to the sensor. In the second configuration, the input tool can contact the chassis and the computing device can be configured to output a second signal in response to input provided to the sensor, with the first signal being unique relative to the second signal.

In some embodiments, the input tool is generally rod-shaped. The chassis can comprise a recess to receive the input tool in the second configuration. The second signal can produce haptic feedback at a surface of the input tool or can indicate a scrolling input. The input tool can be positioned at an end of a trackpad in the chassis when in the second configuration. The input tool can be positioned at an edge of a key-based input device positioned in the chassis when in the second configuration. The input tool can be positioned at an outer side surface of the chassis when in the second configuration.

Another aspect of the disclosure relates to a computing system comprising a housing having a tool retention portion, a keyboard apparatus supported by the housing, a tool removably positioned in the tool retention portion, with the tool having an object sensor, and an electronic component in electronic communication with the sensor and configured to detect an object at the tool retention portion via a signal generated by the object sensor.

In some cases, the electronic component can be further configured to adjust an appearance of a user interface in response to detecting the object. The user interface can be a graphical user interface displayed by a display screen. Adjusting the appearance of the user interface can include changing the appearance of a light emitted from the keyboard apparatus. The object sensor can be configured to generate the signal in response to detecting a portion of a hand of a user. The housing can further comprise a cover over the tool when the tool is positioned in the tool retention portion, wherein the object can be detectable by the object sensor through the cover.

Still another aspect of the disclosure relates to a user interface device comprising an input tool having a length, a tip, and a transducer, with the transducer being configured to sense a force applied at the tip, an input device body having an input tool retention portion, wherein the input tool is movable between a first position retained to the input device body at the input tool retention portion and a second position spaced away from the input tool retention portion, a light source within the input tool or within the input device body, and a set of indicators at a surface of the input tool and distributed along the length of the input tool, with the set of indicators being illuminated by the light source when the input tool is in the first position.

In some cases, the set of indicators can comprise a set of symbols positioned along the length of the input tool. The user interface device can further comprise a light guide positioned in the input tool, with the light guide directing light from the light source to the set of indicators. The set of indicators can comprise a first row of indicators extending lengthwise along a first side of the input tool and a second row of indicators extending lengthwise along a second side of the input tool, with the second side being angularly offset relative to the first side about a longitudinal axis of the input tool. The set of indicators can be configured to be illuminated by diffusion of light through the input tool and can comprise a display positioned at or within the surface of the input tool.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
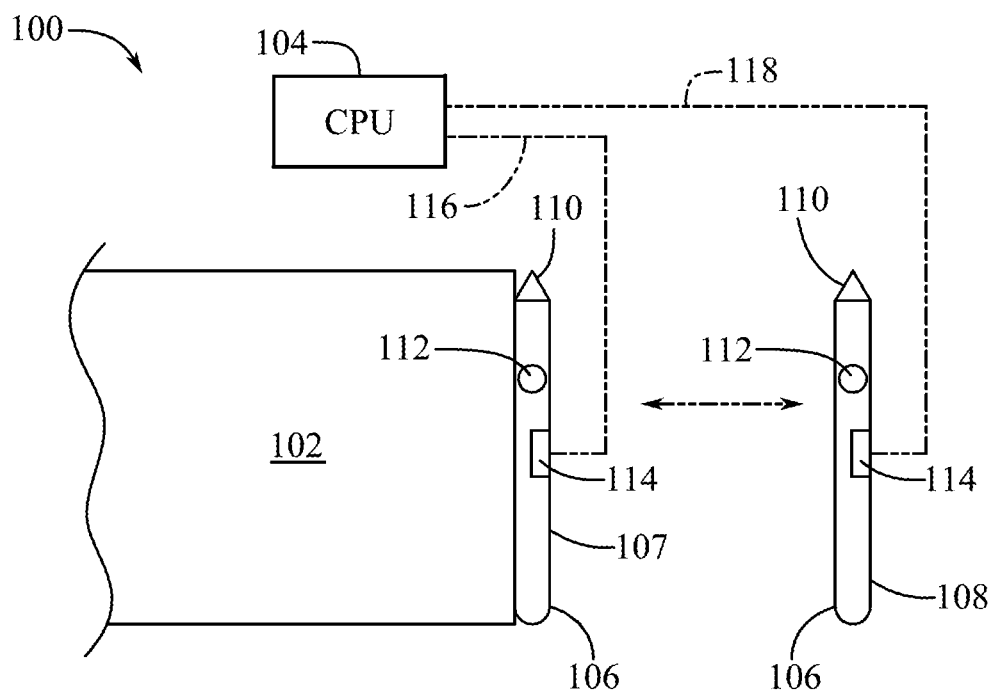
FIG. 1 shows a block diagram of a computing system.

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

Makers and users of electronic devices and systems are in constant need for user interface improvements to make them easier, more efficient, and more comfortable to use. Input devices such as touchscreens can beneficially achieve these goals by being adaptable and reconfigurable to the context and content of the user's utilization of the touchscreen electronic device. For example, some computing devices, such as laptop computers, can have a touch screen positioned in or adjacent to a keyboard of the device that can be configured to provide many more functions than a set of traditional keys. The touch screen can show information in addition to information shown on a main display screen, can simulate key-based typing inputs (and can change which keys are simulated and shown), can receive touch input and gesture input (e.g., one or more sliding touches) across its surface, and more.

However, an ancillary touch screen can be difficult to use in some cases. Touch typists may dislike using the touch screen because it lacks tactile feedback as compared to a set of mechanical, moving keys. The touch screen is also generally positioned near the user's hands and therefore may be prone to being obscured from the user's vision by their own hands. Also, even when the user looks at the touch screen, it is positioned at a different focal distance from the user as compared to the main display, so the user must readjust their head or eyes to effectively read and interact with the touch screen, particularly when the touch screen is positioned at a flat angle while the main display is not. Furthermore, as the benefits of stylus-based input for computing devices have become more and more apparent over time, the inclusion of an ancillary touch screen in the electronic device in addition to the stylus can make the device become overly complex, expensive, and difficult to use. Styluses can have touch sensitivity and display capability, so using a stylus and separate ancillary touch screen with the same device can be redundant.

Accordingly, aspects of the present disclosure relate to computing systems in which a computing device is configured to interact with an input tool, such as a stylus, that can be stored in or on a chassis or housing of the computing device. The input tool can be used as a first type of input device (e.g., a touch- or force-sensitive writing instrument) when it is removed from the chassis and can be used as a second type of input device (e.g., a touch-sensitive button, a touch pad, a set of simulated keyboard keys, or a mechanical input interface) when it is stored on or in the chassis. The input tool can be touch-sensitive at its outer surfaces in a manner that allows a user to tap, touch, or press the outside of the tool to provide a signal to the computing device whether or not the tool is mounted to the computing device. Also, in some cases, the input tool or chassis can comprise features for displaying information to a user, and the information can be visible to the user on or through the input tool when it is handheld or mounted to the chassis.

Accordingly, the input tool can be used to replace or replicate many of the functions and capabilities of an ancillary touch screen while also being able to provide separate stylus-like functionality, thereby reducing the redundancy, cost, and size of the computing system. The input tool can comprise an internal display or set of indicators that interacts and electrically communicates with a keyboard or other associated computing device when the tool is positioned in a socket or recess of the keyboard chassis, and the tool can therefore function similar to an ancillary touch screen or a set of keyboard keys when it is the socket or recess. Removing the tool from the chassis can change the function of the tool or change the meaning and function of its electrical and sensor signals so that it is operable as a stylus or wand input device.

These and other embodiments are discussed below with reference to FIGS. 1 through 23. However, those skilled in the art will readily appreciate that the detailed description given herein with respect to these Figures is for explanatory purposes only and should not be construed as limiting.

FIG. 1 shows a block diagram of a computing system 100 including a chassis 102, a computing device 104, and an input tool 106. The input tool 106 can be positionable relative to the chassis 102 in a first configuration 107 and a second configuration 108. In the first configuration 107, the tool 106 can be mounted to, held against, locked to, supported by, disposed within or attached to the chassis 102. For example, a magnet or mechanical latch can hold the tool 106 to a portion of the chassis 102. See, e.g., FIG. 18 and its related descriptions. In the second configuration 108, the tool 106 can be spaced away from the chassis 102 or substantially spaced away from the chassis 102 (e.g., only the tip 110 or another small fraction of the tool 106 contacts a part of the chassis 102). The tool 106 can also comprise a sensor 112 electrically connected to an electronic communication interface 114 of the tool 106.

The computing system 100 can comprise a computer such as a laptop computer, tablet computer, desktop computer, or other device configured to receive input from an input tool 106 and associated with the chassis 102. For example, the chassis 102 can be a housing or enclosure of a keyboard, notebook computer body, a tablet computer body, a computer accessory or case, or a similar device. The chassis 102 can contain the computing device 104 (e.g., when the chassis is part of a laptop computer) or the computing device 104 can be part of a separate component to which the device of the chassis 102 is connected (e.g., the computing device 104 is in a desktop or tablet computer housing and the chassis 102 is a keyboard electrically connected to the computer housing; see FIG. 2).

The computing device 104 can comprise computer components enabled to receive and send electrical signals between component devices of the system 100 and to and from a user. For example, the computing device 104 can comprise a processor, memory device, electronic storage device, display screen, input adapter interface (e.g., to communicate with electronic communications interface 114 of the tool 106 or to connect to a keyboard), output adapter interface (e.g., to communicate and control a connected display screen), related components, or combinations thereof connected to each other via a bus interface. Accordingly, the computing device 104 can be enabled to electronically interface with the input tool 106 when it is in the first or second configuration 107, 108 by receiving signals from (and potentially sending signals to) the input tool 106.

In the first and second configurations 107, 108 of the tool 106, the sensor 112 of the tool 106 can sense or detect user input. For example, the sensor 112 can comprise an input device (e.g., a touch sensor or mechanical switch) that, when operated by a user, can generate a signal that is transmitted to the computing device 104 using the communications interface 114 or that is detected by the computing device 104 (e.g., using an antenna). Thus, a user can interact with the sensor 112 to provide an input signal 116 when the tool 106 is in the first configuration 107 or an input signal 118 in the second configuration 108. The input signals 116, 118 can be the same or different from each other. The tip 110 can also comprise a sensor that can be used to provide an input signal (e.g., 116 or 118) via the communications interface 114 when the tip 110 is operated (e.g., touched or pressed against a surface) in the first or second configuration 107, 108.

In some embodiments, the input signals 116, 118 sent to the computing device 104 can be identical. Accordingly, operations of the sensor 112 or tip 110 can send the same information to the computing device 104 whether the tool 106 is in the first or second configuration 107, 108. The computing device 104 can receive and react to the input signals 116, 118 identically in either configuration 107, 108. For example, a touch detected by the sensor 112 can be treated as a mouse "click" input in both cases.

In some embodiments, the computing device 104 can receive or react to the input signals 116, 118 differently. The computing device 104 can react differently to each input signal 116, 118 by storing or displaying different information for the user for each input signal 116, 118 or by interpreting the input signals 116, 118 differently. Accordingly, different input signals 116, 118 can cause different operations to be performed by the computing device 104. For instance, one of the input signals 116, 118 can be treated as a binary input (e.g., an on/off permanent or temporary toggle or switch), and the other signal can be treated as a graded or variable input (e.g., a measurement of force or position on the tool 106). In some embodiments, one input signal 116, 118 can be treated as a keyboard key input (e.g., a key-based typing input), and the other input signal can be treated as a remote control input for the computing device 104. Additional variations and embodiments are described in connection with the following figures.

Figure 2:
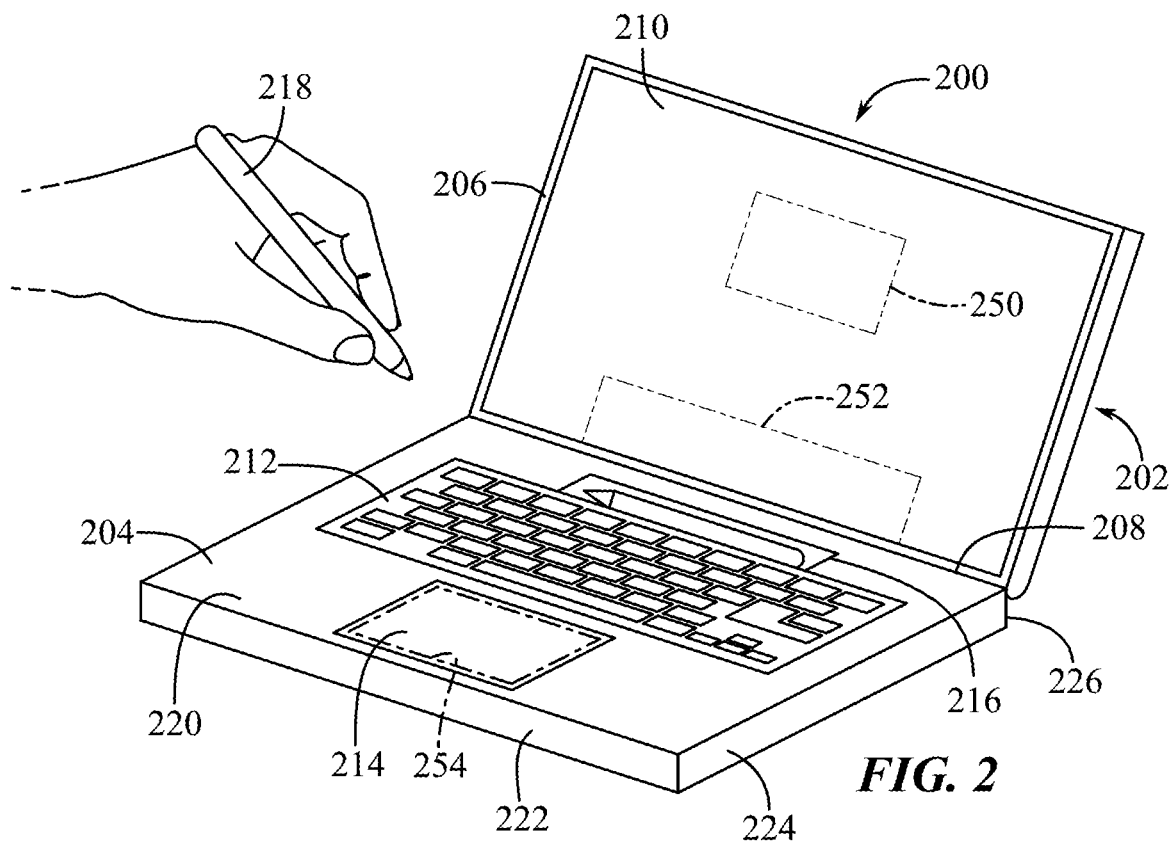
FIG. 2 shows a perspective view of a computing system including a computing device and an input tool.

FIG. 2 shows a perspective view of a computing system 200 including a computing device 202 having a lower housing 204 and an upper housing 206. In some embodiments, such as when the computing device 202 is a laptop or notebook computer, a hinge 208 joins the lower and upper housings 204, 206. In some embodiments, the lower and upper housings 204, 206 can be separate components in electrical communication with each other by a wired or wireless interface, such as when the computing device 202 is a desktop or tablet computer and components in the housings 204, 206. Thus, at least one of the upper and lower housings 206, 204 can contain a processor, memory, a battery, an electronic storage medium, a wireless electronic communications interface, a display, and other computer features and components typically found in a laptop or tablet computing device.

The upper housing 206 can include a display screen 210 in this embodiment. In some cases, the upper housing 206 can comprise components configured to sense and detect the presence of an input tool (i.e., 218) at its surface, such as a touch sensor for detecting the presence of an input tool 218 touching the upper housing 206 at the display screen 210.

Figure 3:
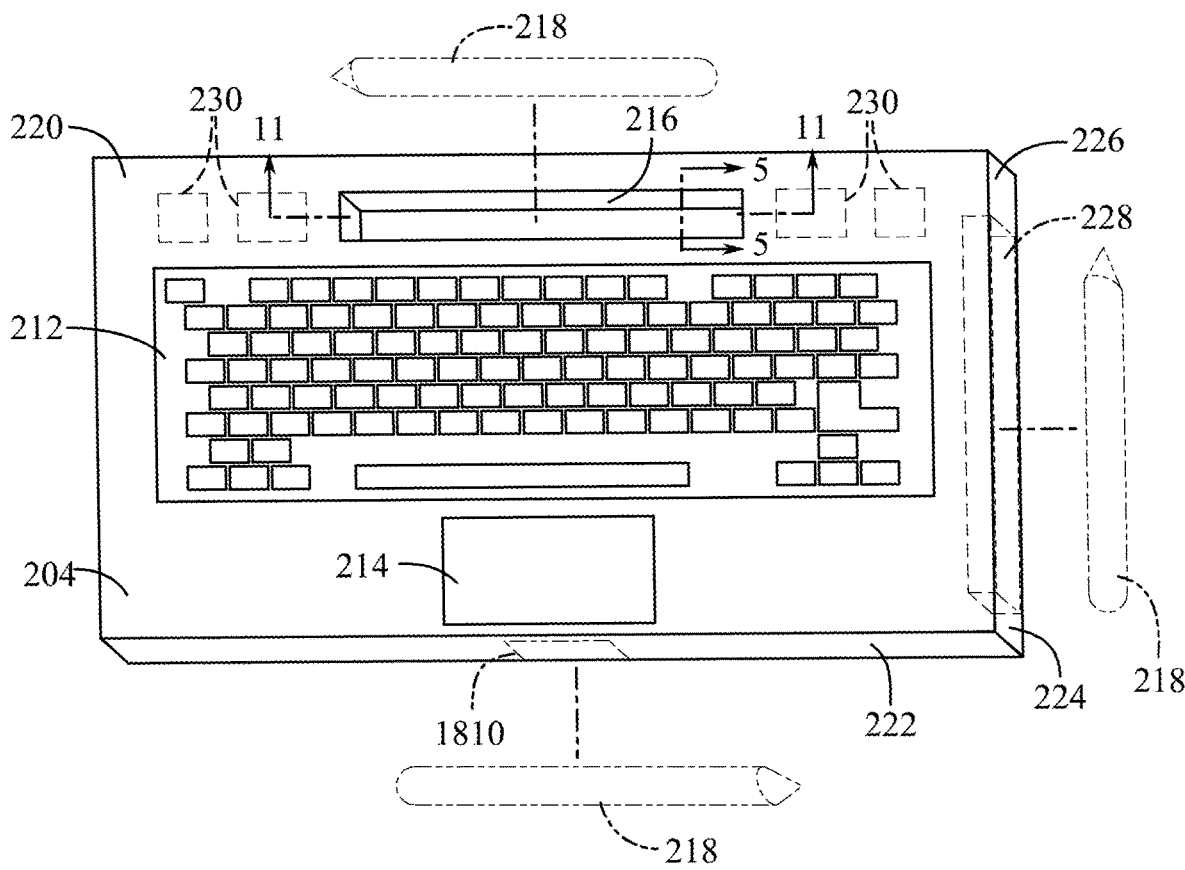
FIG. 3 shows a perspective view of a lower housing of a computing device.

The lower housing 204 can include a keyboard 212 having a set of keys, a substantially flat input area 214 (e.g., a touch-sensitive trackpad or digitizer/pen tablet region), and a tool retainer portion 216. FIG. 3 shows a perspective view of the top of the lower housing 204. As shown in FIGS. 2 and 3, the lower housing 204 can have a top surface 220, a front surface 222, lateral side surfaces (e.g., 224), and a back surface 226. The input area 214 and tool retainer portion 216 can be positioned at the top surface 220. In some embodiments, the tool retainer portion 216 can be located on another side (e.g., surface 222, 224, or 226) of the lower housing 204, as shown, for example, by tool retainer portion 228 in FIG. 3. FIG. 3 also shows that the tool retainer portion 216 can be located at a back end of the lower housing 204, wherein the tool retainer portion 216 is positioned between the keyboard 212 and the back surface 226 or hinge 208. In some embodiments, the tool retainer portion 216 is positioned amid keys of the keyboard 212, as shown by optional keys 230 in FIG. 3. The tool retainer portion 216 can therefore have keyboard keys 230 positioned on two opposite sides of the tool retainer portion 216. In some embodiments, the tool retainer portion 216 has keyboard keys (e.g., keys 230 and keyboard 212) that are on three sides of the tool retainer portion 216. The three sides of the tool retainer portion 216 can be positioned in three orthogonal directions from a center of the tool retainer portion 216. Thus, the tool retainer portion 216 can hold an input tool 218 adjacent to or among a set of keyboard keys. This can be beneficial in making the input tool 218 easy to access and use when it is operated to provide key-based typing input and similar inputs as it is stored in the tool retainer portion 216. See, e.g., FIG. 7 and its related descriptions.

Figure 4A:
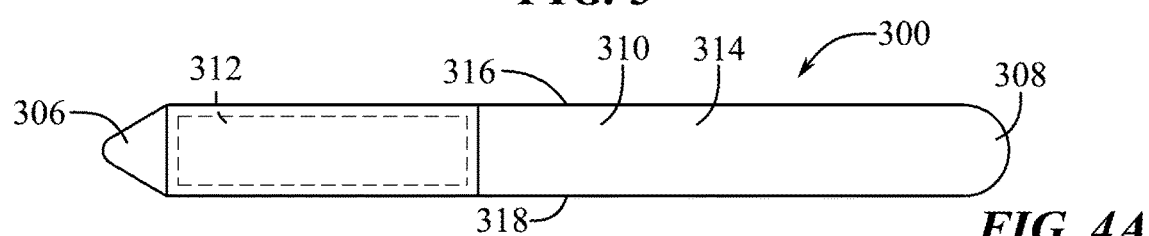
FIGS. 4A-4C show side views of embodiments of input tools.
Figure 4B:
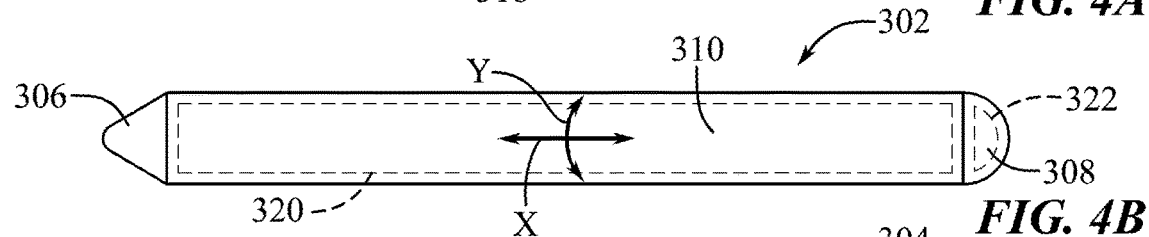
Figure 4C:
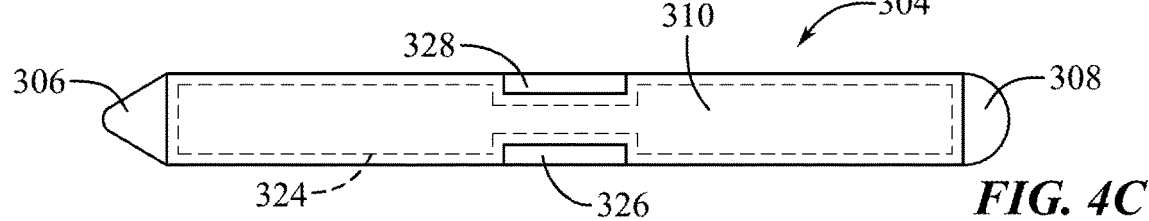

The input tool 218 can comprise an elongated shape configured to be handheld by a user in a manner similar to a wand, stylus, or pencil while it is being used and separated from the lower housing 204. Thus, in some embodiments, the input tool 218 can be referred to as having a rod- or pen-like shape. The input tool 218 can be referred to as being a user interface device or a computer input interface. FIGS. 4A-4C show various embodiments of input tools 300, 302, 304 that can be used as input tool 218 with lower housing 204.

Each input tool 300, 302, 304 can comprise a first end 306 and a second end 308 separated by an elongated body 310. In some embodiments, at least one end 306, 308 is touch- or force-sensitive, wherein a sensor in the input tool 300, 302, 304 is configured to transduce a force or touch applied to the end 306, 308. For example, the first end 306 can be force-sensitive to transduce pressure applied to the first end 306 when a user contacts the first end 306 to a surface in a writing or drawing movement. In some embodiments, the first end 306 can be tapered similar to a pen or pencil.

The elongated body 310 can contain electronic components within the input tool 300, 302, 304. In some embodiments, the elongated body 310 contains a touch or force sensor (e.g., sensor 112) configured to detect a capacitive touch or input force of a user object (e.g., a finger or appendage) against the outer surface of the elongated body 310 or one of the ends 306, 308. The touch or force sensor can be configured to detect a touch or force on various different portions of the input tool 300, 302, 304. For example, as shown by input tool 300, the input tool 300 can have a touch- or force-sensitive side input region 312 extending only partially along an overall length of the elongated body 310. Accordingly, the input tool 300 can have a non-input segment 314 along a remainder of the elongated body 310. The non-input segment 314 can be positioned along a portion of the elongated body 310 having parallel sides 316, 318 (e.g., a cylindrical section or a polygonal prism section of the elongated body 310).

In some embodiments, such as input tool 302, the touch or force sensor can be configured to detect a touch or force on a full length of the elongated body 310, as indicated by input region 320. In some embodiments, an end input region 322 can also be included at at least one end 306, 308. Thus, the full length of the elongated body 310 (e.g., along the entire cylindrical or polygonal prism-shaped midsection of the input tool 302) can be configured to receive an input touch or force. Furthermore, in some cases, the touch or force sensor can be configured to detect a position of the application of the touch or force against the outer surface of the elongated body 310, wherein a longitudinal position (i.e., along axis X in FIG. 4B) and a rotational/angular position (i.e., along direction Y in FIG. 4B) can be determined by the sensor. In some embodiments, the sensor only detects one position (along X or Y). In some embodiments, the sensor only detects whether an input is being provided or not (i.e., it produces an on/off, binary-type signal).

In another embodiment, the input tool 304 can comprise a touch or force sensor that has an input region 324 with at least one middle section 326, 328 that is not touch- or force-sensitive. A middle section 326, 328 can be a location where other input is provided, such as positions of side buttons or switches on the input tool 304. In some embodiments, a middle section 326, 328 is positioned external to an inductive charging coil within the elongated body 310. The coil can be used to provide electrical power to the input tool 304 when the tool 304 is mounted to a tool retainer portion 216. See also FIG. 21.

In some embodiments, the input tools 300, 302, 304 can comprise at least one display or internal light source. For example, the input regions 312, 320, 324 can comprise a display or light source (e.g., a touchscreen display). In some cases, a non-input segment 314 or 326/328 can comprise a display a light source or light guiding feature. In this manner, the display or internal light source can be used to provide or indicate information to a user through the surface of the input tool 300, 302, 304. See also FIGS. 14-15.

Figure 5:
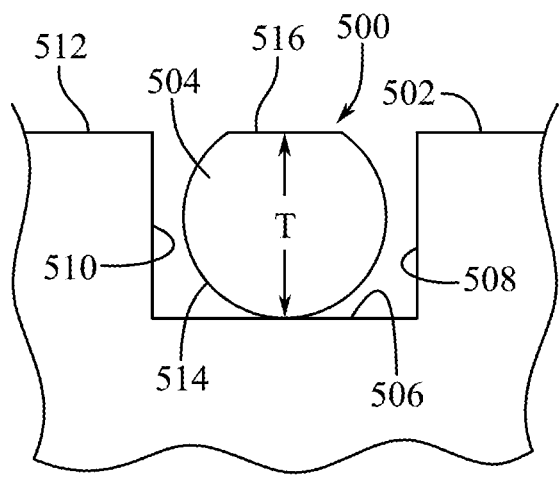
FIG. 5 shows a diagrammatic end section view of a housing and input tool as taken through section lines 5-5 in FIG. 3.
Figure 6:
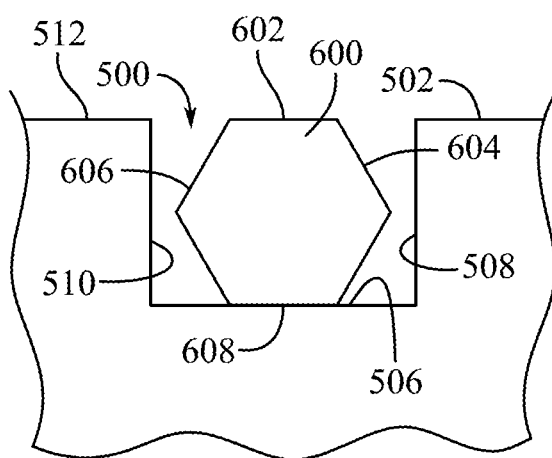
FIG. 6 shows a diagrammatic end section view of a housing and input tool.

As shown in FIG. 2, the tool retainer portion 216 of the lower housing 204 can comprise a recess, groove, or socket in which an input tool 218 can be held or secured. FIG. 5 shows a side section view of an example recess 500 in a housing 502 with an input tool 504 located in the recess 500. The section view can be taken along section lines 5-5 in FIG. 3. As shown in FIG. 5, the recess 500 can have a bottom surface 506, a front side surface 508, and a rear side surface 510 that are positioned under and below a top surface 512. The recess 500 can therefore have a generally rectangular-U-shaped cross-sectional profile in which the input tool 504 contacts the bottom surface 506 thereof. In some embodiments, the recess 500 can have two side surfaces, such as a recess with a generally V-shaped cross-sectional profile. In some embodiments, the recess 500 can have another cross-sectional shape, such a curve (e.g., a round profile or round U-shaped profile) or a profile having more than three side surfaces.

The input tool 504 can have a cross-sectional profile with a curved side surface 514 and a relatively flattened or planar side surface 516. In some embodiments, the input tool 504 has an entirely round or elliptical cross-sectional profile. In some embodiments, the input tool 504 can have a polygonal cross-sectional profile, such as a hexagonal profile, as shown by input tool 600 in FIG. 6. Various cross-sectional profiles can provide different grip features for the comfort and convenience of the user handling the input tool 500/600. Additionally, different side surfaces can display different information to the user. For example, in input tool 600, a top surface 602 can display one set of information (e.g., a first set of symbols or a first display screen), and side surfaces 604, 606 can display other information (e.g., a second or third set of symbols or display screens). Each set of information can therefore be angularly offset or displaced from another set of information. In some embodiments, the information shown on one side (e.g., 602) of the input tool 600 can also be displayed on a different side (e.g., 604/606 or bottom surface 608) so that the input tool 600 can display the same amount or type of information to the user no matter which surface 602, 604, 606, 608, etc. is facing upward. Thus, multiple rotated orientations of the input tool 600 relative to the recess 500 can display different information (or different instances of the same information) to a user.

The input tool 504 can be positioned in the recess 500 with a curved surface 514 contacting one of the side surfaces of the recess 500. In some embodiments, the input tool 504 can be positioned in the recess 500 with a planar side surface 516 contacting one of the side surfaces. With a planar side surface 516 contacting the recess 500, the input tool 504 can be less able or unable to roll in the recess 500. With a planar side surface 516 exposed and facing out of the recess 500, information or a display on the planar side surface 516 can be more visible to a viewer while the input tool 504 is held in the recess 500. With a curved surface contacting the recess 500, the input tool 504 can be rolled or otherwise rotated relative to the recess 500 more easily. See also FIGS. 16-17 and their related descriptions.

The recess 500 can have a depth substantially equal to the thickness T of the input tool 504. The thickness T can be a minimum thickness of the input tool 504 (as opposed to the diameter of the curved surface 514 which is larger than thickness T). In this manner, the top-most surface (e.g., 516) of the input tool 504 can be substantially level with or at the same vertical position as the top surface 512 of the housing 502. Thus, the input tool 504 can be positioned in the recess 500 without protruding from the top surface 512. This can be beneficial to avoid contact between the input tool 504 and objects above the top surface 512, such as when an upper housing (e.g., 202) closes and the display screen (e.g., 210) is positioned over the keyboard 212.

In some embodiments, the recess 500 and input tool 504 can have dimensions wherein the top surface of the input tool 504 protrudes from the recess 500 to a height substantially equal to the height of the keys of the keyboard 212. In this manner, the top surface of the input tool 504 can be comfortably positioned in the same horizontal plane as the keys so that the user does not need to reach higher or lower relative to the keys to reach and touch the input tool 504. In some embodiments, the input tool 504 can have a top surface that is positioned below the plane of the top surface 512 of the housing. Thus, the input tool 504 can be placed in a manner less likely to be accidentally touched by the user or dislodged from the recess 500.

Figure 7:
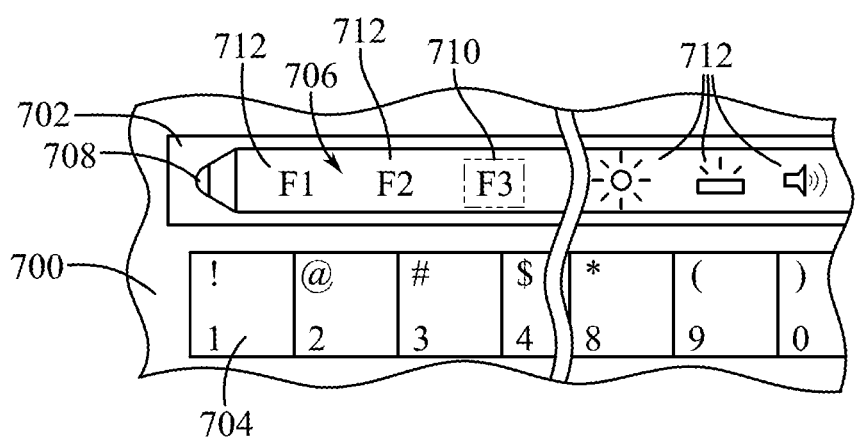
FIG. 7 shows partial top views of a housing and input tool.

FIG. 7 shows partial top views of a housing 700 having a recess 702 and a keyboard 704. An input tool 706 is positioned longitudinally aligned with and within the recess 702. The input tool 706 can have a pointed tip 708 positioned at one end of the recess 702 and a relatively flatter tip at the opposite end thereof. The length of the recess 702 can be larger than the total longitudinal length of the input tool 706 in order to accommodate the entire length of the input tool 706. The width of the recess 702 (shown vertically in FIG. 7) can also be sized to receive the width of the input tool 706. A small gap or space can be formed between the outer limits of the input tool 706 and the inner limits of the recess 702. A user can therefore use a finger to press down on the tip 708 to make the input tool 706 rotate out of the recess 702 and to be graspable by the user on its side surfaces.

The recess 702 can be positioned adjacent to the keyboard 704, wherein at least portions of the input tool 706 are visible or accessible to the user as the user moves their hands across the keys to provide typing input. The recess 702 can be positioned parallel to a row of keys (e.g., the number-row keys, as shown in FIG. 7). In some embodiments, the recess 702 can be parallel to a top row of keys of the keyboard 704 (e.g., the row of keys configured to be furthest from the user or the row of keys furthest from the spacebar). In some embodiments, the recess 702 can have a length substantially equal to a width of a set of keys of the keyboard 704, such as a length equal to the width of about 10 keys to about 12 keys. Accordingly, in some embodiments, the recess 702 can receive an input tool 706 having a longitudinal length in a range of the width of about 9 keys to about 11 keys.

The size and position of the recess 702 and input tool 706 can enable the user to more easily interact with the input tool 706 while it is stored in the recess 702. In some embodiments, touches applied to the input tool 706 can be sensed, detected, or transduced while it is stored in the recess 702. Thus, while the input tool 706 is positioned in the recess 702, the user can provide input to the input tool 706 in addition to providing input via the keyboard 704. The input provided through the input tool 706 can be used, for example, to trigger a function of a key of a conventional keyboard that is missing from the keyboard 704 or that duplicates a function of the keyboard 704. For example, the input tool 706 can comprise a surface 710 that, when touched or pressed by the user, is sensed as being a user input similar to a key function of a keyboard, such as one of the function keys (i.e., "F-keys", such as F3, shown in FIG. 7). Contact with other portions of the surface of the input tool 706 can be detected and produce other outputs, such as the outputs of other function keys (e.g., F1, F2, etc.), system function controls (e.g., screen brightness, keyboard backlight brightness, volume controls, power, sleep, display settings, application settings (e.g., font, size, or color for a word processing or art application), etc.), or other conventional keyboard outputs (e.g., letters, symbols, modifier keys, etc.). As a result, the input tool 706 can be used to provide keyboard input similar to a row of keys while it is positioned in the recess 702. When the user touches the same surface 710 while the input tool 706 is displaced from the recess 702, the input can be ignored or can be interpreted differently (e.g., replicating a mouse "click").

A set of indicators 712 (e.g., words, letters, numbers, icons, shapes, lights, etc.) can be visible at the surface of the input tool 706 at least while it is positioned in the recess 702. In some embodiments, the indicators 712 are recessed into or protrude from the surface of the input tool 706. For example, the indicators 712 can be engraved into the input tool 706. In some embodiments, the indicators 712 are displayed using a display screen (e.g., a touch screen) within the input tool 706 (see FIG. 14). In other embodiments, the indicators 712 comprise a different material or color than the surrounding material of the input tool 706 (e.g., black or clear plastic indicators flush inset into a white plastic housing or metal indicators flush inset into a wooden housing) (see FIGS. 9, 12-13, and 15). In further embodiments, the indicators 712 are visible due to light projected, reflected, or diffused onto the outer surface of the input tool 706 or light projected, reflected, or diffused through the material of the housing of the input tool 706 (see FIGS. 8, 10, 11, and 15).

Figure 8:
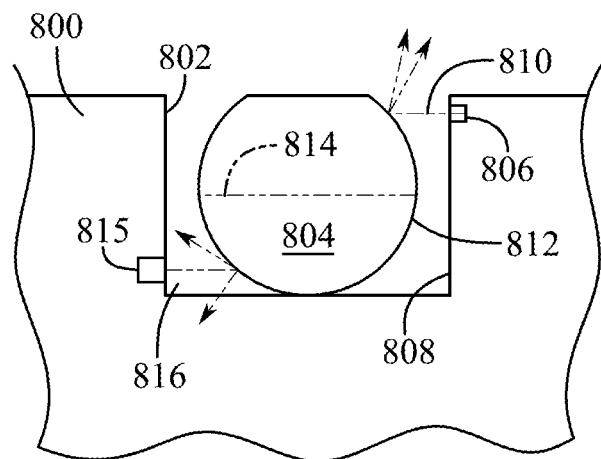
FIG. 8 shows a diagrammatic end section view of a housing and input tool being illuminated.

FIG. 8 illustrates an end view of an example embodiment of a housing 800 having a recess 802 in which an input tool 804 is positioned. The housing 800 can comprise a light source 806 in a sidewall 808 of the recess 802. The light source 806 can be configured to project light 810 against a side surface 812 of the input tool 804 that is reflected and diffused in a manner visible to the user. Accordingly, an indicator 712 can be generated by reflecting light from a light source 806 that is emitted onto a side surface of the input tool 706.

In some embodiments, the light source 806 can comprise a laser, a light-emitting diode (LED) (e.g., a micro LED), a similar device, or combinations thereof. The light source 806 can be positioned in the recess 802 or can pass through a wall of the recess 802. For example, the light source 806 can be used to backlight a keycap (e.g., for keyboard 704), and some of the light from that backlight can be redirected (e.g., by a reflector, fiber optic, light guide, or similar feature) from beneath the keycap to the sidewall 808 of the recess 802.

The light source 806 is shown at the top end of the recess 802 near the mouth thereof in FIG. 8. The light source 806 can therefore be positioned at or above a top half of the input tool 804 (e.g., above mid-height line 814). This can be beneficial for an input tool 804 having a generally rounded cross-sectional profile since the light 810 can be reflected in an upward direction and out of the recess 802 toward the user. In some embodiments, a light source 815 can be positioned below the midline of the tool 804 and can reflect light 816 around the lower portion of the recess 802 without reflecting directly upward or out of the recess 802. In this manner, the recess 802 can have diffuse illumination that can help illuminate one or both elongated sides of the input tool 804 rather than having localized illumination or a specific symbol showing on the tool. In various embodiments, a plurality of light sources (e.g., 806, 815) can be spaced out along the length of the recess 802 to provide multiple points of illumination for the tool 804 and recess 802. These multiple points can make the illumination of the tool 804 and recess 802 more even and consistent.

Figure 9:
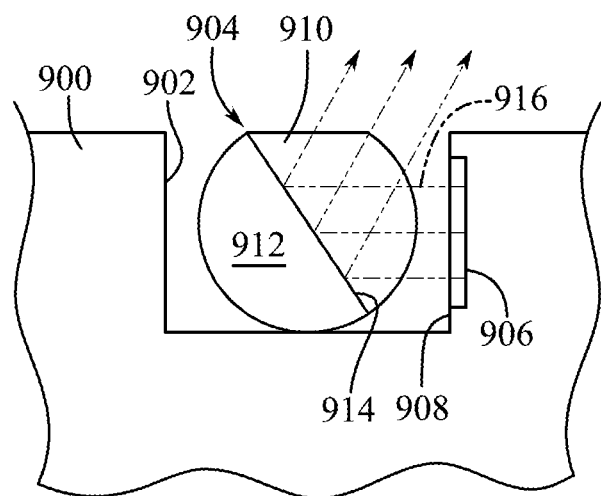
FIG. 9 shows a diagrammatic end section view of a housing and input tool being illuminated.

FIG. 9 shows another embodiment of a housing 900 having a recess 902 in which an input tool 904 is positioned. In this case, a light source 906 is positioned in a sidewall 908 of the housing 900, and the input tool 904 comprises a transparent portion 910 and an opaque portion 912. An internal reflective surface 914 can be located between the transparent portion 910 and the opaque portion 912. Light 916 emitted from the light source 906 can be reflected from the reflective surface 914 and out of the recess 902 to a user's viewing position.

The reflective surface 914 can comprise a smooth, mirror-like finish of the transparent portion 910 or opaque portion 912 so that parallel light 916 is reflected at substantially the same angle from the reflective surface 914. Accordingly, the light source 906 can beneficially be an array of light sources (e.g., an array of pixel lights or a display screen) configured to generate indicators (e.g., 716) that are reflected from a mirror-like, flat surface (e.g., 914) of the input tool 904. The indicators can therefore have an appearance of being generated from within the input tool 904. In some embodiments, the transparent portion 910 can be omitted, at least where the light source 906 is located, and the reflective surface 914 can be an external surface of the input tool 904. The light source 906 can have a longitudinal length substantially equal to a length of the reflective surface 914 or a length of a touch-sensitive portion of the input tool 904.

Figure 10:
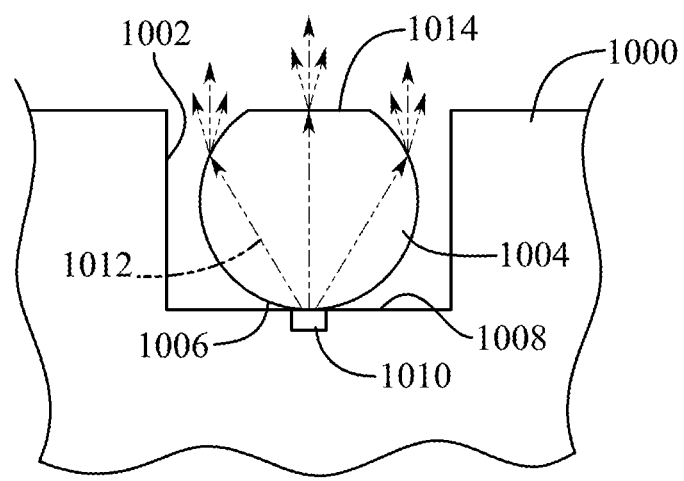
FIG. 10 shows a diagrammatic end section view of a housing and input tool being illuminated.

FIG. 10 shows another similar end view of a housing 1000 having a recess 1002 in which an input tool 1004 is located. An outer surface 1006 of the input tool 1004 can contact an inner surface 1008 of the recess 1002. A light source 1010 in the recess 1002 can emit light 1012 into the outer surface 1006, and the light 1012 can be diffused through the input tool 1004. At the sides or top of the input tool 1004, the light 1012 can make the surfaces of the input tool 1004 appear to glow or have its own internal light source. To do so, the input tool 1004 can comprise a translucent material configured to allow light to diffuse and pass through the input tool 1004 from the outer surface 1006 to surfaces viewable by the user.

In some embodiments, the input tool 1004 can comprise partially diffuse material, wherein some surfaces (e.g., top surface 1014) can comprise a translucent material, and other surfaces (e.g., the sides of the tool) can comprise opaque material configured to prevent transmission of light from the light source 1010. Accordingly, certain portions of the perimeter of the input tool 1004 can be internally illuminated by a light source 1010 that is external to the perimeter of the input tool 1004.

Figure 11:
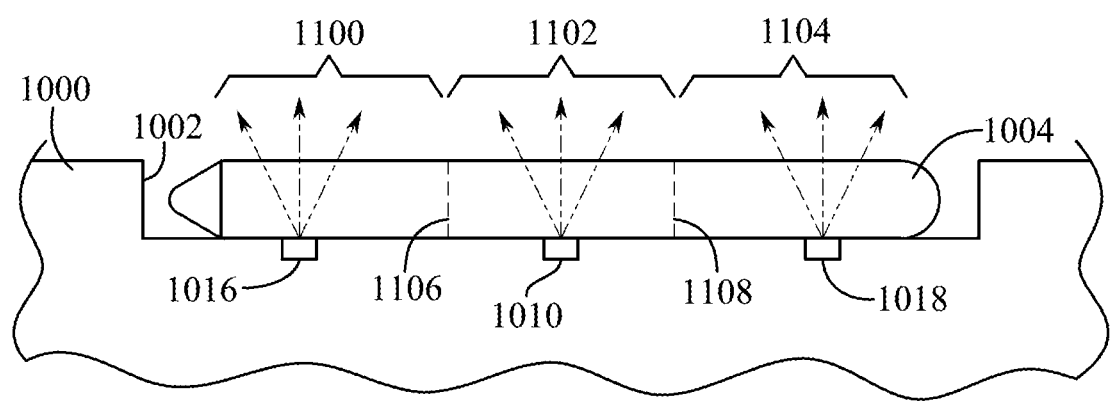
FIG. 11 shows a diagrammatic side section view of a housing recess and input tool being illuminated.

FIG. 11 shows a diagram of a side view of a housing 1000 as viewed from section lines 11-11 in FIG. 3. In some embodiments, multiple light sources 1010, 1016, 1018 can be configured to emit light into the input tool 1004 at different points along the length of the input tool 1004. The input tool 1004 can therefore have multiple segments 1100, 1102, 1104 that each diffuse light received from a separate light source 1010, 1016, 1018. In some embodiments, the input tool 1004 can comprise internal dividers 1106, 1108 configured to reduce or prevent diffusing light from one segment (e.g., 1100) into a neighboring segment (e.g., 1102). In this manner, different functions or status indicators can be visually displayed by different segments 1100, 1102, 1104 of the input tool 1004. For example, each segment 1100, 1102, 1104 can indicate a different feature of the computing device or can signify a different keyboard function that is performed when the segment 1100, 1102, 1104 is touched or pressed by the user. Using the light sources 1010, 1016, 1018, the input tool 1004 does not need to have indicators (e.g., 712) on its surface to be able to indicate that different inputs can be provided at each of the segments 1100, 1102, 1104 because the light passing through the input tool 1004 provides a visible indication for each segment.

Figure 12:
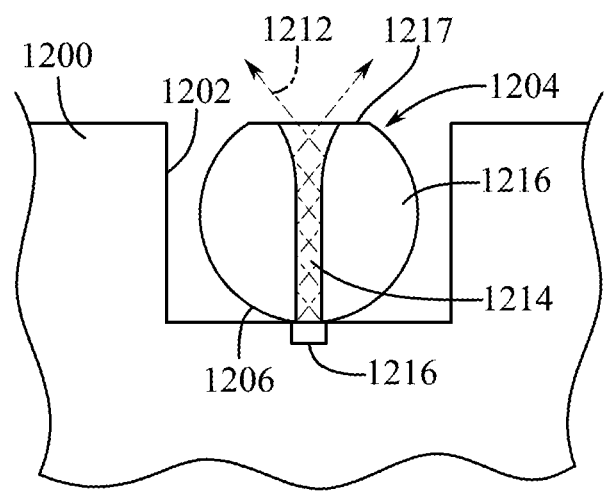
FIG. 12 shows a diagrammatic end section view of a housing and input tool.

FIG. 12 illustrates another end-facing section view of a housing 1200 having a recess 1202 containing an input tool 1204. Similar to light source 1010 in FIG. 10, a light source 1210 can contact an outer surface 1206 of the input tool 1204 and can emit light into the surface 1206 of the input tool 1204. In this case, the light 1212 is emitted into a light guide portion 1214 of the input tool 1204 which extends through an external portion 1216 of the input tool 1204. The light guide portion 1214 extends diametrically across the input tool 1204. In some embodiments, the light guide portion 1214 can extend through a curved or angled path through the input tool 1204 that connects one outer surface 1206 to another, opposite outer surface 1217.

The external portion 1216 can comprise an opaque material, and the light guide portion 1214 can comprise a transparent or translucent material. Thus, when light 1212 is emitted into the surface 1206, the light 1212 can reflect or diffuse through the light guide portion 1214 before being visible at an outer surface (e.g., top surface 1217) of the input tool 1204. In some embodiments, the light guide portion 1214 can comprise a surface shape perimeter or geometry that forms at least one symbol or other indicator. Thus, light 1212 passing through the input tool 1204 can be emitted from a portion of the top surface 1217 that forms a shape or signal to the user such as an indicator 712. In some embodiments, light can be internally reflected by sides of the light guide portion 1214 or external portion 1216 in order to preserve brightness of the light 1212 as it emerges from the top surface 1217. Accordingly, the light guide portion 1214 can comprise a material configured for total internal reflection of the light 1212 that enters at the outer surface 1206 before it reaches the top surface 1217.

Figure 13:
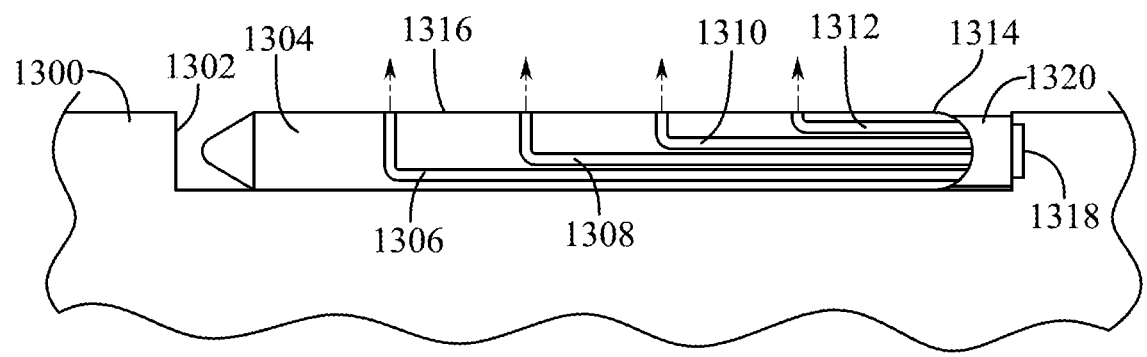
FIG. 13 shows a diagrammatic side section view of a housing recess and input tool.

FIG. 13 shows a diagrammatic side view of a housing 1300 having a recess 1302 containing an input tool 1304. In this case, the input tool 1304 can comprise a set of light guides 1306, 1308, 1310, 1312 that extend from a terminal end 1314 of the input tool 1304, longitudinally through at least a portion of the length of the input tool 1304, and end at or near a top surface 1316 of the input tool 1304. A light source 1318 of the recess 1302 can emit light into the terminal end 1314, and light can thereby enter the light guides 1306, 1308, 1310, 1312 and can be directed through the light guides to the top surface 1316. The ends of the light guides 1306, 1308, 1310, 1312 at the top surface 1316 can be spaced apart to indicate different features and functions at different parts of the length of the top surface 1316.

In some embodiments, a cap or retainer 1320 can be positioned between the terminal end 1314 and the light source 1318, and the retainer 1320 can help direct light from the light source 1318 into the light guides 1306, 1308, 1310, 1312. In some cases, the light source 1318 can be positioned in the retainer 1320. The retainer 1320 can have an inner surface that follows a contour or surface shape of the terminal end 1314 and can therefore help prevent leakage of light around the terminal end 1314. For example, the retainer 1320 can have a surface having a radius of curvature that is substantially equal to a radius of curvature of the terminal end 1314 of the input tool 1304.

Furthermore, in some embodiments, the retainer 1320 can apply pressure to the input tool 1304 to ensure tight-fitting contact between the terminal end 1314 and the retainer 1320. For example, the retainer 1320 can comprise a resilient material configured to deflect when contacting the terminal end 1314 or the entire retainer 1320 can move relative to the recess 1302 (e.g., via a spring-loaded fitting) to come into contact with the input tool 1304. The user can place the input tool 1304 into the recess 1302 and, with the same application of force, apply pressure to the retainer 1320 to move the retainer into a tight fit against the terminal end 1314.

In some embodiments, the retainer 1320 can comprise electrical contacts configured to engage a connector of the input tool 1304, thereby providing electrical power or other electrical data communication between the input tool 1304 and the housing 1300. The electrical contacts can be radially spaced apart at the terminal end 1314 and on the retainer 1320 in a manner that allows electrical connection between the input tool 1304 and the retainer 1320 in multiple different orientations of the input tool 1304.

Figure 14:
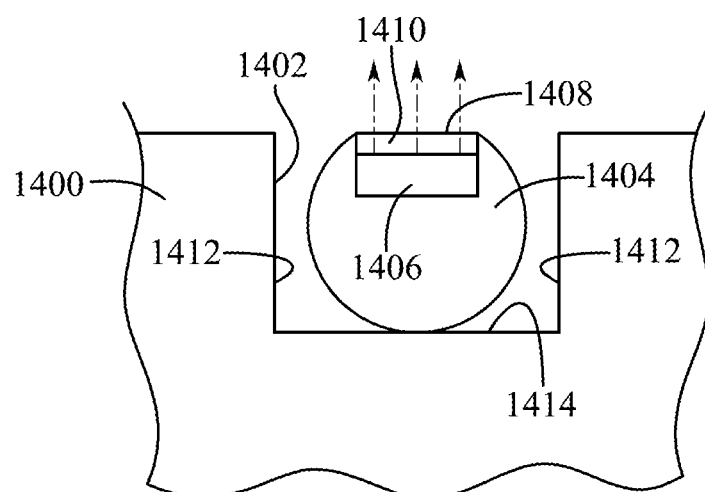
FIG. 14 shows a diagrammatic end section view of a housing recess and input tool.

FIG. 14 shows an end-facing section diagram of another embodiment of a housing 1400 having a recess 1402 in which an input tool 1404 is located. In this embodiment, the input tool 1404 can comprise an internal light source 1406. The light source 1406 can comprise an LED, bulb, or similar light-producing device, and in some cases the light source 1406 can comprise a display screen (e.g., a backlit liquid crystal display (LCD), micro-LED or organic LED (OLED) display, or similar apparatus). The light source 1406 can emit light that is visible through an outer surface 1408 of the input tool 1404 and that is made visible to the user. The light source 1406 can be configured to display patterns, colors, shapes, symbols, or other indicators. In some embodiments, the light source 1406 is configured to duplicate or supplement information displayed on a main display (e.g., 210).

In some embodiments, the light source 1406 is at the outer surface 1408 of the input tool 1404, and in some cases, the light source 1406 is recessed below the outer surface 1408 or is covered by a transparent or translucent cover 1410 (e.g., a clear panel, lens, light diffuser, or related device). The outer surface 1408 in FIG. 14 is shown at the top of the input tool 1404 while the tool is located in the recess 1402 so that the top of the tool 1404 can be viewed by the user without the sides of the recess 1402 blocking line of sight. In some embodiments, the input tool 1404 can be rotated, and the outer surface 1408 can be positioned at a side or bottom of the input tool 1404. The light emitted from the light source 1406 can emerge toward the sides 1412 or bottom 1414 of the recess 1402 to either restrict viewing of the light to certain viewing angles or to illuminate the recess 1402. The internal light source 1406 can be powered by an internal energy storage device (e.g., a battery) of the input tool 1404 or can be powered by current induced via a wireless power transmission coil in the housing 1400. See also FIG. 20 and its related descriptions herein. In some configurations, multiple light sources 1406 can be positioned along the length of the input tool 1404.

Figure 15:
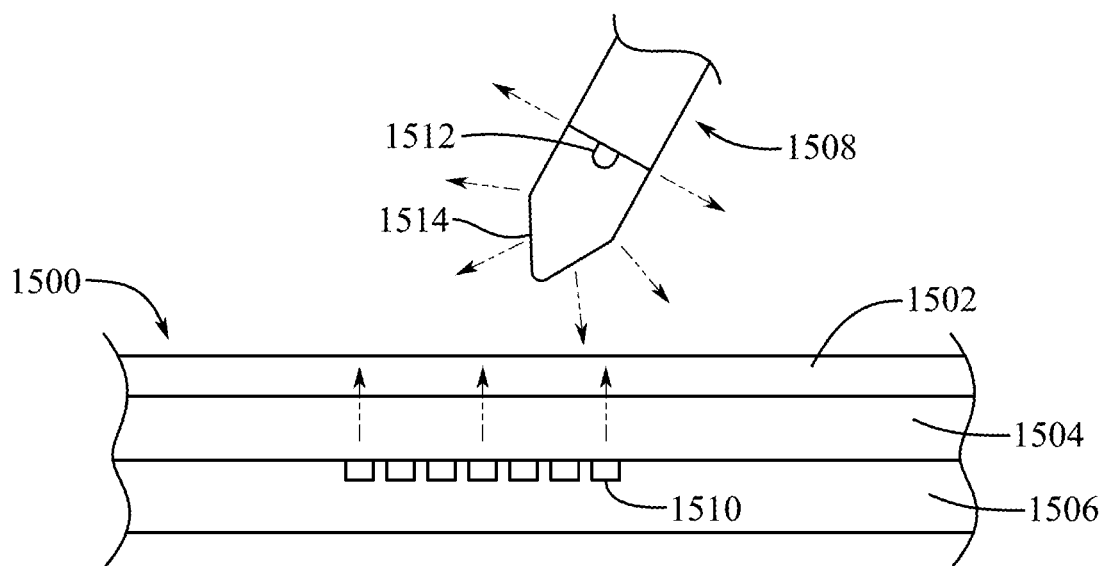
FIG. 15 shows a diagrammatic side section view of a housing and input tool.

FIG. 15 shows a diagrammatic side view of an electronic device 1500 having a transparent cover 1502, a sensor array 1504, and a display 1506. The electronic device 1500 can be a computing device 202 of computing system 200. The cover 1502 can protect the sensor array 1504 and display 1506 from being contacted by external objects (e.g., input tool 1508 or a user's appendage). The sensor array 1504 can be configured to sense the position or presence of an object (e.g., input tool 1508) contacting or slightly above the cover 1502. Thus, the sensor array 1504 can be a capacitive touch sensor array configured to detect a change in capacitance caused by an object at the cover 1502. The display 1506 can comprise a set of light-emitting devices 1510 (e.g., OLED or micro-LED pixels) that emit light through the sensor array 1504 and cover 1502. Alternatively, the display 1506 can comprise a backlit LCD or similar conventional display device.

The input tool 1508 can comprise an internal light source 1512 and a transparent or translucent tip portion 1514. The display 1506 can emit a color or set of colors from the light-emitting devices 1510 that are positioned adjacent to or below the tip portion 1514 of the input tool 1508. A signal representing the color or set of colors from the light-emitting devices 1510 adjacent to or below the tip portion 1514 can be transmitted from a device controller (e.g., 104) to a receiver or controller of the input tool 1508 (e.g., via a wireless electronic communications interface 114), and the signal can be used to control the color properties (e.g., hue, saturation, and brightness) of the light source 1512. In some embodiments, the color properties of the light source 1512 can be controlled to be a reflection of the color properties of the light-emitting devices 1510. For example, the light source 1512 can be controlled to emit light having a similar hue as the color of the devices 1510 or an average hue (or other representative hue) of multiple pixels or light-emitting devices 1510 in the display 1506. As the input tool 1508 is moved relative to the display 1506, the color properties of light emitted by the light source 1512 can be changed corresponding to different light-emitting devices 1510 that are in different adjacent parts of the display 1506.

Figure 16:
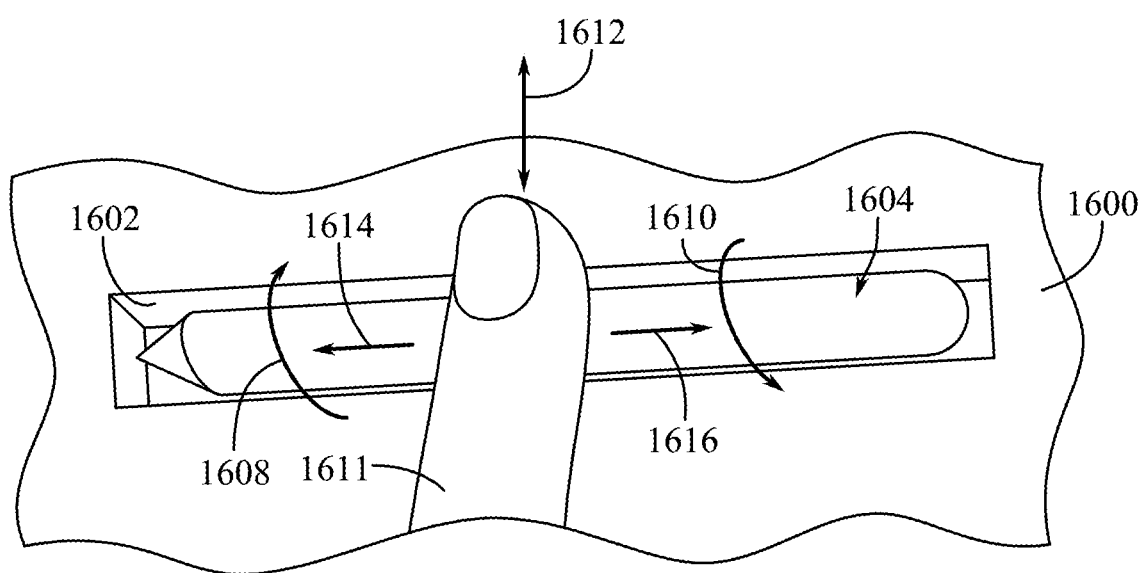
FIG. 16 shows a diagrammatic perspective view of an input tool being operated in a recess of a housing.

FIG. 16 shows a perspective view of an electronic device housing 1600 having a recess 1602 in which an input tool 1604 is located. The input tool 1604 can comprise a rounded outer surface 1606 that is touch-sensitive, similar to the embodiments of FIGS. 4A-4C and other input tools described in connection with the other figures herein. The input tool 1604 can be configured to be rotatable about its longitudinal axis while positioned in the recess 1602, as indicated by arrows 1608 and 1610. The input tool 1604 can be prevented from rolling off of the housing 1600 by contacting side surfaces of the recess 1602 as it rotates. Alternatively, at least one counter-roller positioned in the housing 1600 can roll in contact with and beneath the input tool 1604 to help prevent the input tool 1604 from translating along the direction of motion of a user appendage 1611 moving along an axis 1612 perpendicular to the longitudinal axis of the input tool 1604. Additionally, a retainer (e.g., 1320) can keep the input tool 1604 from moving out of the recess 1602.

As the input tool 1604 rotates about its longitudinal axis, a measurement device can measure and determine the amount or rate of angular displacement of the input tool 1604. For example, the measurement device can comprise an inertial measurement unit (IMU) within the input tool 1604 can determine the amount of rotation by use of an accelerometer, gyroscope, or similar apparatus. Alternatively, rotation of a counter-roller or movement of an outer surface of the input tool 1604 can be measured by a sensor in the housing 1600. In some embodiments, a touch-sensitive outer surface 1606 can track the position of an object (e.g., 1611) relative to the outer surface 1606 as the input tool 1604 rotates, and the movement of the object across the outer surface 1606 can be used to determine the rotation of the input tool 1604. For example, the circumferential distance that an object moves around the outer surface 1606 as the input tool 1604 rotates can be used to determine the angular displacement of the input tool 1604.

The rotation of the input tool 1604 can be measured and tracked as a user input to the electronic device. In some embodiments, the rotation of the input tool 1604 can be used to control functions of an electronic device that are conventionally controlled by a rotatable wheel-like device, such as a mouse wheel that controls scrolling, zoom, or size adjustment functions. Rotation of the input tool 1604 can therefore cause the electronic device to perform those scrolling, zoom, or size adjustment functions. Furthermore, in some embodiments, rotation of the input tool 1604 can be used to adjust the position of a symbol or object displayed on a main display (e.g., 210) of the electronic device. For instance, rotating the input tool 1604 about its longitudinal axis can cause a mouse or text cursor to move vertically across the main display.

In some embodiments, a sensor (e.g., a touch sensor) can track the position of an object (e.g., 1611) as it moves relative to the outer surface 1606 of the input tool 1604 in a direction parallel to the longitudinal axis of the input tool 1604, such as in directions 1614 and 1616 in FIG. 16. The position of the object can be used to control scrolling, zoom, or size adjustment at a main display or other functions of an electronic device that are conventionally controlled by a mouse or scroll wheel. In some embodiments, movement of the object across the outer surface 1606 parallel to the longitudinal axis of the input tool 1604 can cause a mouse or text cursor to move horizontally across a main display. Accordingly, rotation of the input tool 1604 can provide a first type of control signal to the electronic device (e.g., moving a cursor or scrolling vertically), and translation of a user object relative to the outer surface 1606 can provide a second type of control signal to the electronic device (e.g., moving a cursor or scrolling horizontally). The movement of the input tool 1604 can be confined to the limits of the recess 1602, thereby making the input tool 1604 a compact scrolling or pointing input device that is alternatively usable as a writing, drawing, or pointing tool when removed from the recess 1602.

Figure 17:
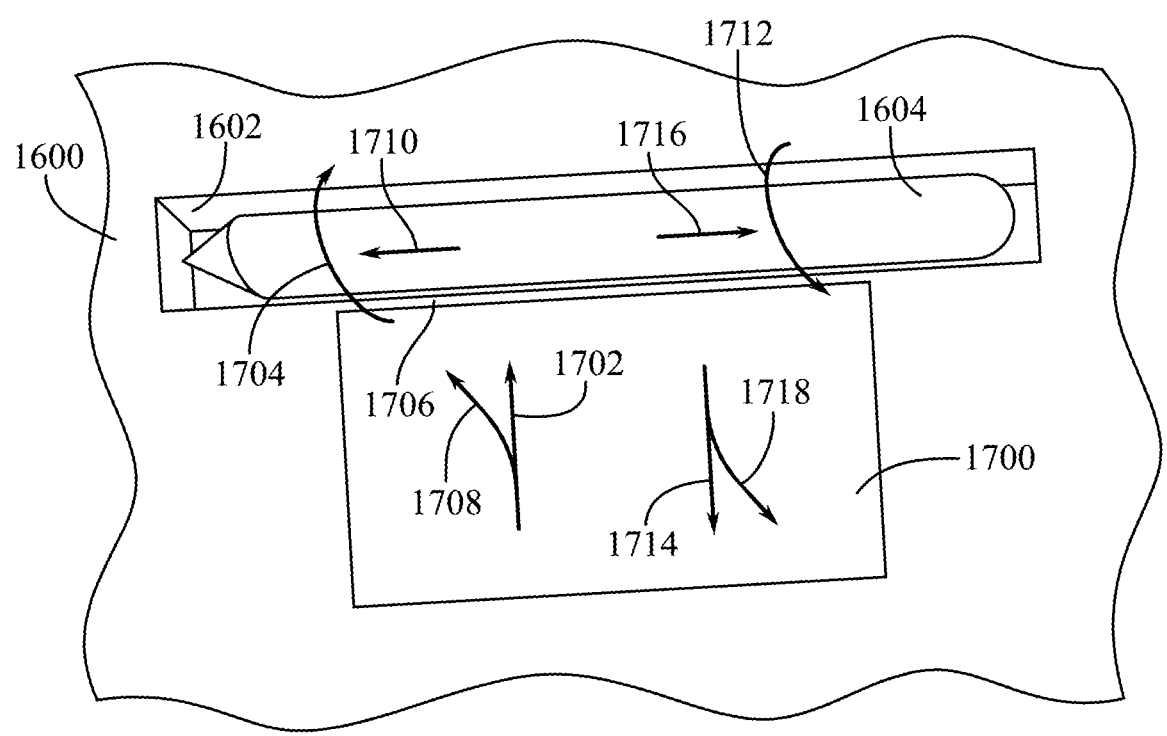
FIG. 17 shows another diagrammatic perspective view of an input tool being operated in a recess of a housing near a trackpad.

The recess 1602 can be positioned at various locations on the housing 1600. In some cases, the recess 1602 can be located at an end of, or along a side of, a keyboard, similar to the recess 702 of FIG. 7. FIG. 17 shows an embodiment wherein the recess 1602 is located adjacent to a trackpad 1700 touch input device. A user object can provide touch input to the trackpad 1700 to control the electronic device. In addition, the same user object can provide touch or rotational input to the input tool 1604 in the recess 1602.

The input provided to each input device 1700, 1604 can have a substantially similar function (e.g., both can control cursor movement), can supplement each other, or can be used for separate functions. For example, a motion of the user object detected by the trackpad 1700 can be supplemented when a user object causes movement of the input tool 1604. One user object (e.g., one hand of the user) can provide input to the trackpad 1700 while the another object (e.g., their other hand) can provide input to the input tool 1604. Accordingly, multiple functions of the electronic device can be controlled independently and simultaneously by the trackpad 1700 and input tool 1604.

Furthermore, in some cases, a motion of a user object can be continued across each input device 1700, 1604. For example, when a user performs an upward sliding movement across the trackpad 1700 (e.g., along arrow 1702) with a user object, the object can transition from contacting the trackpad 1700 and engage contact with the input tool 1604, thereby rotating the input tool 1604 about its longitudinal axis, as indicated by arrow 1704. Thus, providing input to the input tool 1604 can effectively extend a gesture or touch input provided to the trackpad 1700. A cursor moving upward on a display (as the user object moves along arrow 1702) can continue to move upward as the input tool 1604 begins to rotate due to the user object coming into contact with the input tool 1604 at the edge 1706 of the trackpad 1700. Similarly, a diagonal swiping movement (i.e., along arrow 1708) of a user object on the trackpad 1700 can be continued as the user object reaches the edge 1706 and rotates the input tool 1604 while moving longitudinally parallel to the axis of the input tool 1604, as indicated by arrows 1704 and 1710.

Moreover, input that is provided to the input tool 1604 can be continued or extended as the user object transitions from the input tool 1604 to the trackpad 1700. A rotational movement of the input tool 1604 (e.g., arrow 1712) followed by linear movement across the trackpad 1700 (e.g., arrow 1714) can result in a continuous result on a display screen, such as a continuous vertical movement of a cursor or continuous vertical scrolling. Similarly, rotational and lateral movement of the user object on the input tool 1604 as indicated by arrows 1712 and 1716 that is followed by movement of the user object on the trackpad 1700 along arrow 1718 can result in continuous diagonal movement of an object on a main display.

Figure 18:
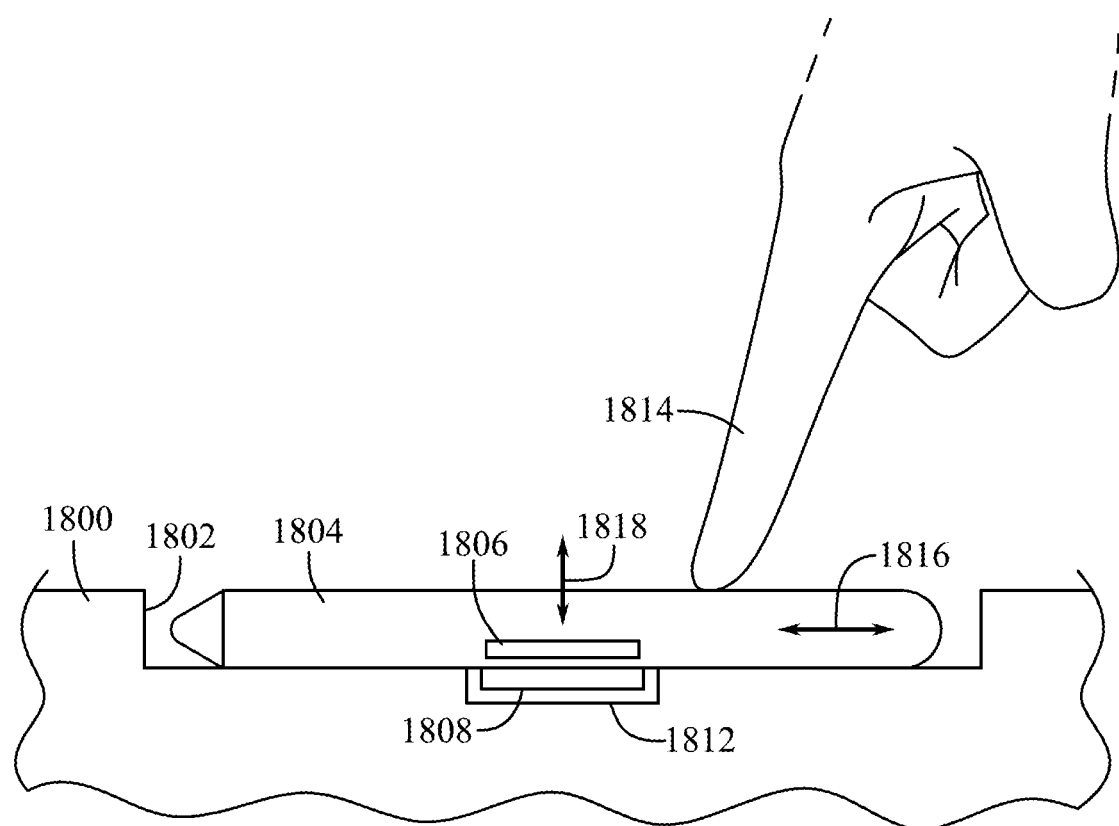
FIG. 18 shows a diagrammatic side section view of a housing recess and input tool.

In some embodiments, the input tool can be used to provide feedback to a user or can have features by which it is retained to the housing. FIG. 18 shows a diagrammatic side view of a housing 1800 having a recess 1802 in which an input tool 1804 is located. The input tool 1804 can comprise a magnetic element 1806, and the recess 1802 can comprise a magnetic element 1808 configured to be paired with and located adjacent to the magnetic element 1806 of the input tool 1804.

The magnetic elements 1806, 1808 can comprise magnetic or magnetizable materials that are magnetically attracted to each other, thereby providing a force attracting the input tool 1804 into the recess 1802 and helping to retain the input tool 1804 in the recess 1802 while it is not being carried by the user. For example, the magnetic elements 1806, 1808 can comprise a permanent magnet, an electromagnet, a semi-permanent magnet (i.e., a magnet with reversible polarity), a ferrous/magnetically attracted material, or a similar apparatus or material. Accordingly, the magnetic elements 1806, 1808 can magnetically hold the input tool 1804 to the housing 1800.

In some embodiments, a housing magnetic element 1808 can be positioned in the housing 1800 separate from the recess 1802, such as being within a tool retainer portion (e.g., 228) on a front, side, or top surface (e.g., 222, 224, 220) of the housing 1800. See also FIG. 2. For example, a magnetic element 1810 can be positioned at a front outer surface 222 of lower housing 204.

At least one of the magnetic elements 1806, 1808 can also be connected to a feedback driver. For example, as shown in FIG. 18, the housing magnetic element 1808 can be connected to haptic driver 1812. In some embodiments, the tool magnetic element 1806 can also be connected to a haptic driver in the input tool 1804. The haptic driver 1812 can comprise a winding, a coil, an additional magnetic element, a motor, a piezoelectric driver, a vibrator, or another structure configured to move one of the magnetic elements 1806, 1808, the housing 1800, or the input tool 1804. In some embodiments, the feedback driver can comprise a visual or audible indicator configured to produce a feedback indicator that is visible or audible to a user, such as a light source 1512. Furthermore, in some embodiments a magnetic element 1806, 1808 can comprise temporarily reversible polarity, and the computing system can be configured to change the polarity of one or both magnetic elements 1806, 1808 to repel each other and to help eject the input tool 1804 from the recess 1802. For example, a magnetic element 1806, 1808 can comprise an aluminum-nickel-cobalt (Al—Ni—Co) magnetic structure enabled to have its polarity reversed in response to application of an input electrical signal to the magnetic element. A magnetic element with reversible polarity can be used to repel the input tool 1804 from the recess 1802.

In some embodiments, when the input tool 1804 is located in the recess 1802 and a user object 1814 (e.g., appendage) contacts, is detected by, or applies a force to the input tool 1804, the feedback driver (e.g., 1812) can produce feedback for the user. For example, when a user presses the input tool 1804 into the bottom of the recess 1802, the haptic driver 1812 can produce a haptic output that slightly shakes, vibrates, pulses, or otherwise drives movement of the input tool 1804 relative to the recess 1802. In some embodiments, the haptic driver 1812 can apply a magnetic force to the tool magnetic element 1806 to cause the input tool 1804 to move. Similarly, the feedback driver can provide a visual or audible feedback indicator to the user (e.g., production of light or sound). In some embodiments, the feedback driver's feedback is actuated by application of a threshold amount of force applied to the input tool 1804 by the user object. In this manner, the output of the feedback driver can be provided only when the user presses against the input tool 1804 with a force in excess of the threshold. Alternatively, one type of feedback can be provided when a force below the threshold is applied (e.g., a small vibration or emission of light), and a second type of feedback can be provided when a force exceeding the threshold is applied (e.g., a heavier vibration, brighter light, or audible noise).

When a haptic feedback is produced using the haptic driver 1812, the input tool 1804 can be moved parallel to a longitudinal axis 1816 or in a radial direction 1818 relative to the longitudinal axis 1816. Thus, in some cases the haptic feedback force can drive movement of the input tool 1804 in a direction substantially perpendicular to a direction of the input force applied by the user object 1814, parallel to the length of the recess 1802, or parallel to the longitudinal axis 1816 of the input tool 1804.

Furthermore, in some cases the magnetic elements 1806, 1808 can be configured to transduce movement of the input tool 1804 relative to the housing 1800 or to transduce a force applied along the longitudinal axis 1816. For example, a user object 1814 can apply a force at least partially directed parallel to the longitudinal axis 1816 of the input tool 1804, and the magnitude of the force component that is parallel to the longitudinal axis 1816, or the sliding movement of the input tool 1804 relative to the recess 1802, can be detected or measured as a type of user input to the input tool 1804. In some embodiments, when the input tool 1804 has moved in this manner, the magnetic elements 1806, 1808 can then bias the input tool 1804 back to a default position in the recess 1802, thereby allowing the user to repeat the sliding input again, similar to how a mouse button returns to a default position after it has been "clicked". Accordingly, the input tool 1804 can laterally or longitudinally translate or deflect to "click" in addition to rotating or providing haptic feedback when contacted or pressed by a user.

Figure 19:
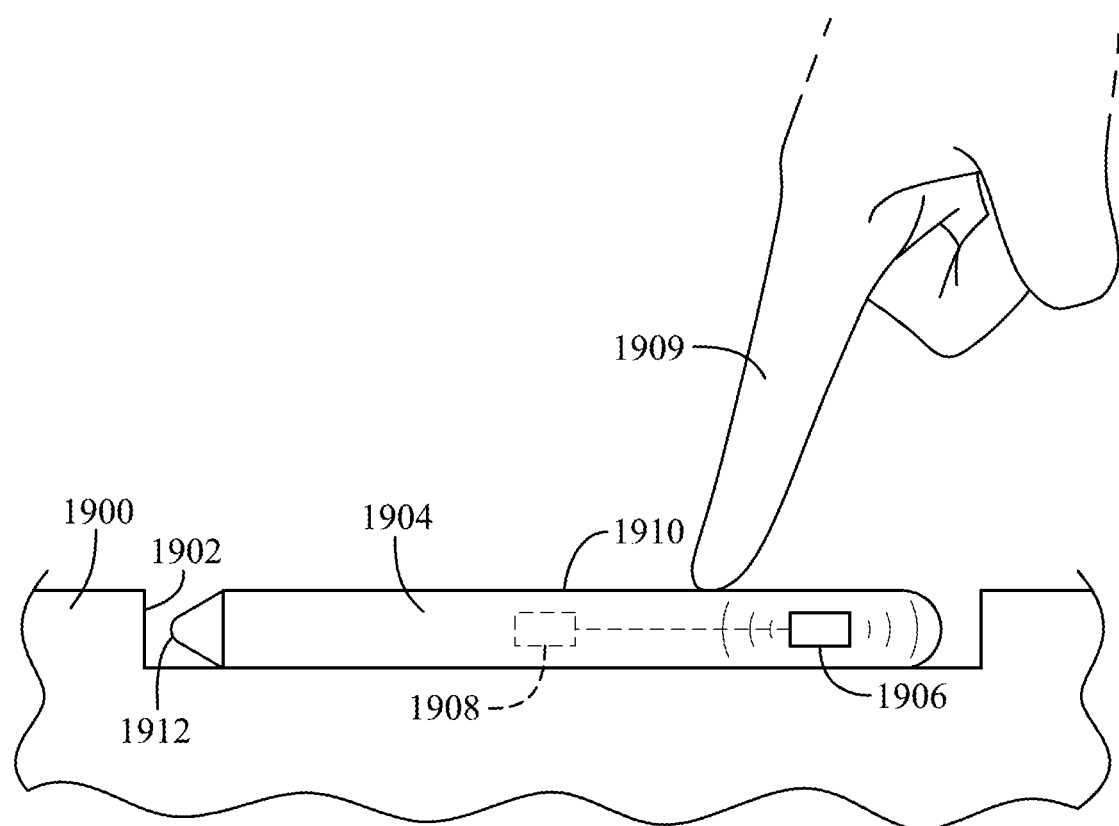
FIG. 19 shows a diagrammatic side section view of a housing recess and input tool.

FIG. 19 shows another embodiment of a housing 1900 having a recess 1902 containing an input tool 1904. In this embodiment, the input tool 1904 comprises an internal feedback driver 1906 and a sensor 1908 configured to detect a user object 1909 contacting or applying a force to the outer surface 1910 of the input tool 1904. The sensor 1908 can be a sensor 112 described in connection with FIG. 1. The feedback driver 1906 can comprise a haptic, audible, or visual feedback generator configured to actuate in response to a signal generated by the sensor 1908 (or a connected controller) when the user object 1909 is detected. For example, in some embodiments, the feedback driver 1906 can be a light source (e.g., 1512). The feedback driver 1906 can therefore indicate to the user (via feel, sight, or sound generated within the input tool 1904) that the sensor 1908 has detected the user object 1909 or an action performed by the user object 1909. Furthermore, when the input tool 1904 is separated from the housing 1900, the feedback driver 1906 can be used to generate feedback in response to other user inputs to the input tool 1904, such as touching or pressing against the outer surface 1910, pressure against the tip 1912, or reorientation of the input tool 1904 in space (e.g., via an IMU; see FIG. 23).

Figure 20:
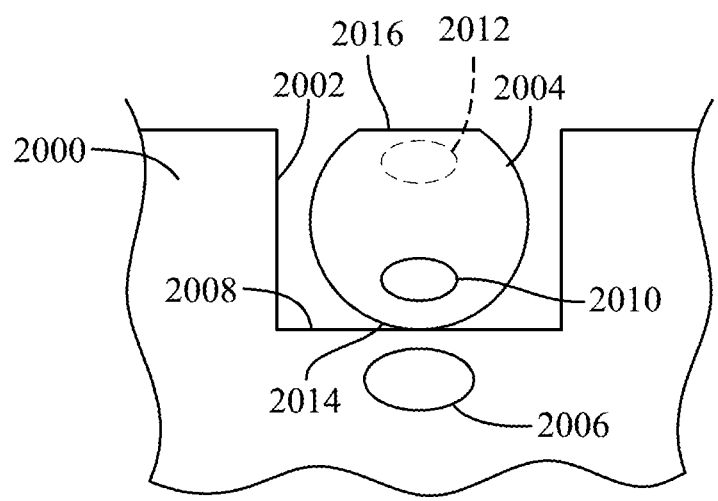
FIG. 20 shows a diagrammatic end section view of a housing and input tool.

FIG. 20 provides a diagrammatic end view of a housing 2000 having a recess 2002 in which an input tool 2004 is located. The housing 2000 can comprise an inductive winding or coil 2006 adjacent to a bottom surface 2008 of the recess 2002. In some embodiments, the coil 2006 can be located in a side surface of the recess 2002. The input tool 2004 can comprise a corresponding winding or coil 2010 configured to be positioned proximate to the surface 2008 in which the housing coil 2006 is positioned. These coils 2006, 2010 can be paired to provide current to the input tool 2004 via induction, and the current can be used to power electronic components in the input tool 2004, such as to charge a battery or power a display (e.g., 1406) in the input tool 2004.

In some embodiments, the input tool 2004 can comprise an additional coil 2012 configured to be used in place of, or to supplement, the other tool coil 2010. Thus, the input tool 2004 can receive current by approximating a first side surface 2014 with the bottom surface 2008 and thereby positioning the first coil 2010 within current-generating range of the housing coil 2006. The input tool 2004 can alternatively receive current by approximating the opposite side 2016 to the bottom surface 2008 and thereby positioning the second coil 2012 within range of housing coil 2006. In this manner, the input tool 2004 can have multiple different orientations relative to the recess 2002 in which the input tool 2004 can receive current. In some embodiments, multiple coils can be positioned in the housing 2000, and the input tool 2004 can comprise one coil that is configured to be positioned near one of the multiple housing coils. Moreover, the housing 2000 and input tool 2004 can each comprise multiple coils for an even greater number of possible working positions.

Figure 21:
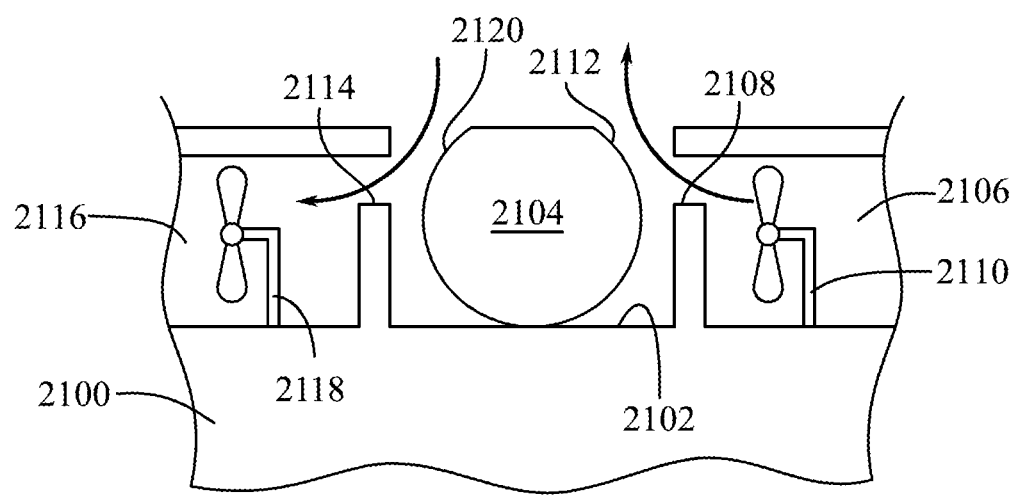
FIG. 21 shows a diagrammatic end section view of a housing and input tool with airflow passages in the housing.

FIG. 21 shows a diagrammatic end view of a housing 2100 of an electronic device having a recess 2102 containing an input tool 2104. In this embodiment, the input tool 2104 can be used as an airflow guide for the housing 2100. For instance, the housing 2100 can comprise an exhaust passage 2106 with an exhaust opening 2108 linking the exhaust passage 2106 to the recess 2102. Airflow through the exhaust passage 2106 can be driven via a fan 2110 or other airflow driver (e.g., convection) through the opening 2108 and into the recess 2102. The airflow can be directed upward and out of the recess 2102 rather than passing mainly horizontally from the opening 2108 due to the airflow coming into contact with and being redirected by a side surface 2112 of the input tool 2104. Accordingly, the presence of the input tool 2104 can help improve directing heated air away from the housing 2100.

Additionally, in some embodiments, the housing 2100 can comprise an intake opening 2114 that leads to an intake passage 2116. Airflow can be drawn by a fan 2118 or other airflow driver through the opening 2114 and into the intake passage 2116. For example, the fan 2118 can draw cool external air into the housing 2100 to cool internal components of the electronic device. The input tool 2104 can comprise a side surface 2120 configured to help direct airflow that comes from a position outside the recess 2102 into the intake opening 2114. In some embodiments, the fans 2110, 2118 can be a single fan configured to provide both exhaust and intake flow.

Furthermore, in some embodiments, the housing 2100 can comprise both an exhaust opening 2108 and an intake opening 2114, and the input tool 2104 can beneficially block the direct passage of airflow from one opening 2108 to the other opening 2114. In other words, the intake opening 2114 can face the exhaust opening 2108, and the input tool 2104 can comprise a surface positioned directly between the openings 2114, 2108 in a manner that prevents flow along a linear path between the openings 2114, 2108. The bifurcation of the recess 2102 and airflow into and out of the recess 2102 can help ensure that cooler air passes into the intake opening 2114 and that warmer air passes from the exhaust opening 2108, thereby improving the efficiency of the cooling system of the electronic device. More efficient flow paths around the input tool 2104 can allow the recess 2102 to have smaller (e.g., less visible and less susceptible to intake of debris) airflow openings.

Figure 22:
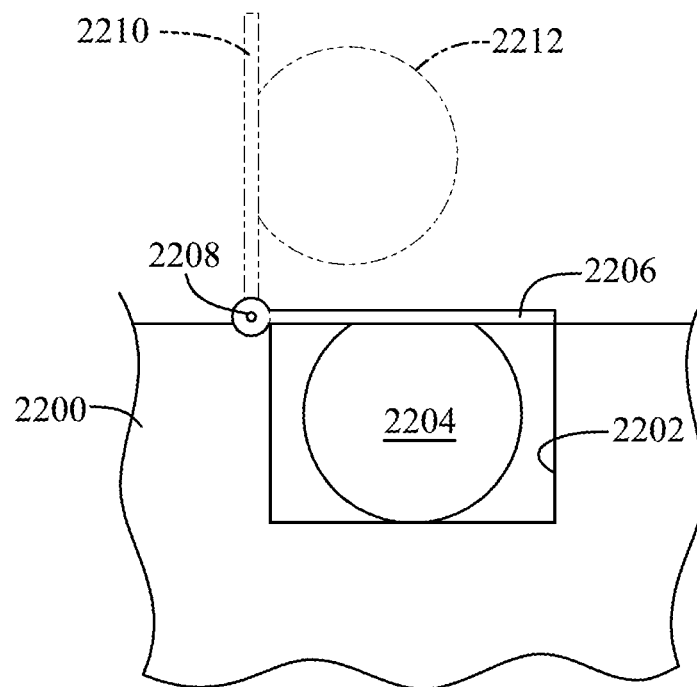
FIG. 22 shows a diagrammatic end section view of a housing and input tool with a cover.

FIG. 22 shows a diagrammatic end view of another embodiment of a housing 2200 having a recess 2202 holding an input tool 2204. A cover 2206 can be positioned at the top end of the recess 2202 or above the recess 2202 to reduce or eliminate visibility of the inside of the recess 2202 when the cover 2206 is closed and to help retain the input tool 2204 in the recess 2202. In some embodiments, the cover 2206 can be translucent or transparent to allow light coming from the input tool 2204 or within the recess 2202 to be visible external to the cover 2206. In some embodiments, the cover 2206 can comprise a material and thickness that enables the input tool 2204 to detect a user touch applied to the cover 2206. For example, the cover 2206 can comprise a material that is substantially transparent to or that transfers an electric field generated by a user object (e.g., a finger) contacting the cover 2206, and the input tool 2204 can therefore sense the object from the opposite side of the cover 2206.

The cover 2206 can be connected to the housing 2200, for example, by a hinge 2208. The hinge 2208 can allow the cover 2206 to pivot relative to the housing 2200, such as by allowing the cover 2206 to pivot to the position at indicator numeral 2210. Accordingly, the cover 2206 can move about the hinge 2208 to expose or cover the input tool 2204 and recess 2202. Exposing the recess 2202 can enable the user to insert or remove the input tool 2204, and covering the recess 2202 can limit access to the input tool 2204 and provide additional security in retaining the input tool 2204 to the housing.

In some embodiments, the cover 2206 and input tool 2204 can be reversibly attachable and detachable from each other, wherein the input tool 2204 can be attached to the cover 2206 and can move with the cover as it rotates, as indicated by indicator 2212. Thus, the input tool 2204 can move relative to the recess 2202 as the cover 2206 moves relative to the housing 2200. Additionally, the input tool 2204 can be attachable to the cover 2206 when the cover 2206 is in an open configuration (i.e., at 2210) so that the cover 2206 stows the input tool 2204 in the recess 2202 as the cover 2206 moves to the closed configuration. In some embodiments, the cover 2206 is not attached to the input tool 2204, and movement of the cover 2206 relative to the housing 2200 can actuate or manipulate a mechanism in the housing 2200 that pushes the input tool 2204 or otherwise ejects it out of the recess 2202, thereby making it easier for the user to remove the input tool 2204 from the recess 2202. For example, rotating the cover 2206 can actuate an electromagnet (e.g., 1808) to eject the input tool 2204 from the recess 2202.

Figure 23:
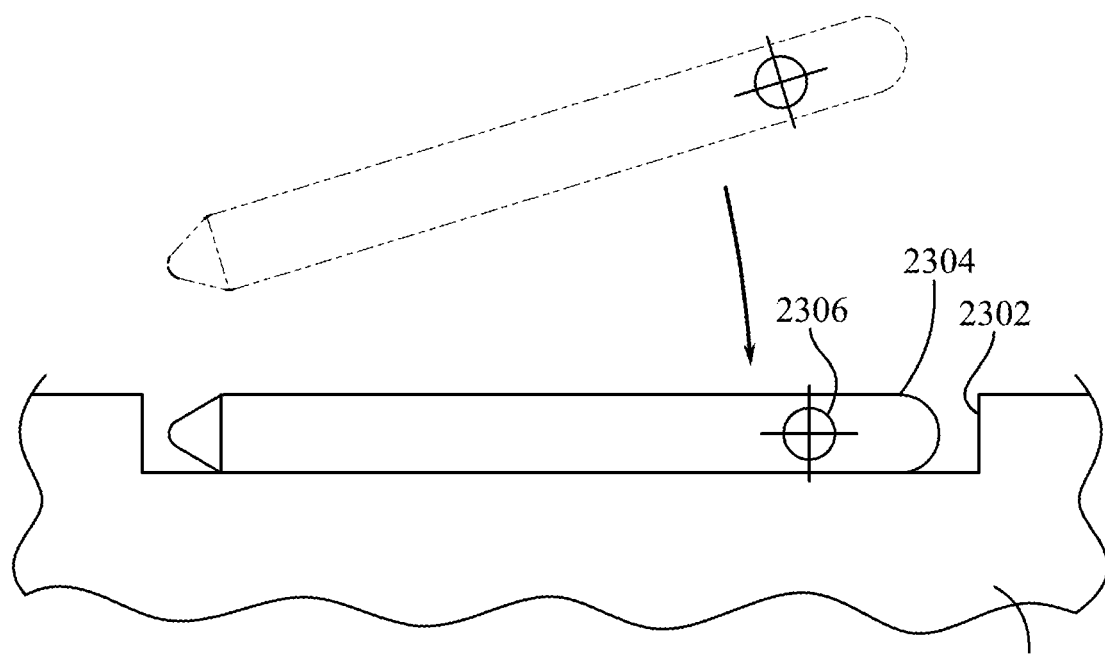
FIG. 23 shows a diagrammatic side section view of a housing recess and input tool.

FIG. 23 illustrates another diagrammatic side view of a housing 2300 having a recess 2302 holding an input tool 2304. This input tool 2304 is shown with an inertial measurement unit (IMU) 2306 configured to transduce translation or rotation of the input tool 2304. For instance, the IMU 2306 can track rotation of the input tool 2304 about its longitudinal axis in a manner similar to an IMU of input tool 1604. The IMU 2306 can also be used to track tilt and translation of the input tool 2304. Thus, output signals of the IMU 2306 can be used to determine whether the input tool 2304 is positioned external to or within the recess 2302 or whether or not the tool 2304 is positioned on a flat surface. When the input tool 2304 is tilted or determined to be outside a recess 2302 or out of contact with the housing 2300, the input tool 2304 can provide a first type of functionality, such as functionality similar to a pen input device, input tool 1508, and a first set of touch signals when a user touches or presses against the outer surface of the input tool 2304. When the input tool 2304 is contacting the recess 2302, lying on a horizontal surface, or against a housing 2300, it can provide a different type of functionality, such as functionality similar to the input tools described in connection with FIGS. 5-14 and 16-22. Accordingly, tracking the position and orientation of the input tool 2304 can control how movements and inputs provided to the input tool 2304 are interpreted by a controller.

In some cases, the input tool 2304 can be used as a wand-like device to provide inputs to an electronic device (e.g., via gesture control using the input tool 2304). The position and orientation of the input tool 2304 can be used as inputs to control applications and features of the electronic device. Furthermore, the electronic device can comprise tracking components to supplement or enhance the position and orientation tracking of the input tool 2304. For example, the electronic device can comprise an infrared emitter/receiver or a camera configured to detect the input tool 2304 in space relative to the housing of the electronic device. Movement of the input tool 2304 while being detected by the sensors of the electronic device can improve the determination of the position and orientation of the input tool 2304 using the IMU 2306. In some embodiments, the recess 2302 can comprise a sensor to detect the presence of the input tool 2304 in a manner supplementing the output of the IMU 2306 to determine the orientation of the input tool 2304 within the recess 2302.

Referring again to FIG. 2, the computing system 200 can comprise a display screen 210 used to display graphical information to a user. In some embodiments, the positioning or detection of the input tool 218 relative to the lower housing 204 (e.g., relative to a tool retainer portion 216) can affect the provision of information via the display screen 210. For example, a first piece of information 250 can be shown on the display screen 210 when the input tool 218 is retained in or detected in the tool retainer portion 216. Upon removal of the input tool 218 from the lower housing 204, the first piece of information 250 can be replaced or added to by a second piece of information 252 on the display screen 210. Thus, movement of the input tool 218 relative to the lower housing 204 or relative to the tool retainer portion 216 can cause a change in the information displayed by the display screen 210. In some embodiments, the display screen 210 can show neither the first nor second pieces of information 250, 252, and movement of the input tool 218 can initiate the display of one or both pieces of information 250, 252.

In some embodiments, pieces of information 250, 252 shown on the display screen 210 can include a menu or set of graphical symbols indicating a status of the input tool 218. For example, movement of the input tool 218 can cause the computing system 200 to display information regarding the battery state of charge or other information about the settings or features of the input tool 218. The information 250, 252 can be shown persistently or temporarily on the display screen 210.

In some embodiments, the computing system 200 can detect the presence of a user object adjacent to the tool retainer portion 216. For example, the input tool 218 can comprise a capacitive or motion sensor (e.g., an infrared emitter/receiver) configured to detect the presence of an appendage of the user over the tool retainer portion 216. The input tool 218 can be positioned in the tool retainer portion 216 when the user object is detected. Upon detection of the user object using a sensor of the lower housing 204, in the tool retainer portion 216, or of the input tool 218, the computing system 200 can be configured to display a piece of information 250 or 252 on the display screen 210.

In some embodiments, the information 250/252 shown can indicate a function of the computing system 200 that will be enabled or actuated upon the user object making contact with (or applying sufficient force to) the input tool 218 while it is in the tool retainer portion 216. For example, an input tool 218 can display a duplicate set of the set of indicators 712 across the display screen 210 as part of the information 252. In some embodiments, no indicators 712 are provided on the input tool 218, and the indicators 712 are instead only shown in the information 252 on the display screen 210. In some embodiments, indicators 712 are provided on the input tool 218, and supplementary or secondary functions of the input tool 218 are shown in the information 252 on the display screen 210. In some embodiments, removing the user object from proximity to the tool retainer portion 216 (e.g., moving it over the keyboard 212 or away from the lower housing 204 entirely) can change or remove the information 250, 252 shown on the display screen 210.

In some embodiments, the position of the user object relative to the tool retainer portion 216 can be detected, and the information 250/252 shown can be controlled as a reflection of the position of the user object. For example, if the user object is positioned adjacent to the left end of the input tool 218, the left end of a menu of information 252 can be highlighted. Similarly, the position of the display of information 250/252 can move according to the position of the user object relative to the input tool 218.

Furthermore, in some embodiments, the input area 214 can comprise an internal display or indicator 254. The input tool 218 can be used to provide input at the input area 214, such as by tapping or swiping on the input area 214. In some embodiments, information displayed on the internal display or indicator 254 can change in response to the operation of the input tool 218 on the input area 214. For example, a user may making a writing motion on the input area 214 with the input tool 218, and the display or indicator 254 can display a line as if the user were writing on the input area 214. The information shown by the internal display or indicator 254 can change (e.g., being activated or deactivated) based on the status and position of the input tool 218 relative to the tool retainer portion 216. For example, the internal display or indicator 254 can be dimmed or off when the input tool 218 is stowed at the tool retainer portion 216, and the internal display or indicator 254 can be brightened or show different information when the input tool 218 is removed from the tool retainer portion 216 or when the input tool 218 is detected or determined to be positioned adjacent to the input area 214.

Features and aspects of the input devices and housings described in connection with one embodiment of the present disclosure can be combined with or replaced by features and aspects of other embodiments disclosed herein. Accordingly, the embodiments described herein can be used in many different combinations and permutations to obtain a variety of computing systems and input devices that are not described in connection with a single figure or numerical indicator herein.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A computing device system, comprising:
a computing device including a housing;
an input tool removably mounted to the housing, the input tool having a rod shape and a longitudinal axis; and
a measurement device configured to determine a property of angular displacement of the input tool in response to rotation of the input tool about the longitudinal axis while the input tool is mounted to the housing; wherein:
the measurement device comprises a sensor in the input tool configured to track a position of an object relative to an outer surface of the input tool to determine the property of angular displacement.

2. The computing device system of claim 1, wherein the measurement device further comprises a sensor positioned within the housing and configured to determine the property of angular displacement.

3. The computing device system of claim 1, wherein the housing defines a recess, the input tool is removably mounted to the housing in the recess, and the measurement device is configured to determine the property of angular displacement in response to rotation of the input tool within the recess.

4. The computing device system of claim 1, wherein a rounded outer surface of the input tool comprises the measurement device and the measurement device comprises a touch sensor configured to determine the property of angular displacement.

5. The computing device system of claim 4, wherein:
the input tool comprises a first end and a second end separated by an elongated body; and
the touch sensor is configured to sense a touch of the object on the elongated body or to sense a force of the object on the elongated body.

6. The computing device system of claim 5, wherein the input tool comprises at least one middle section including a button or a switch.

7. The computing device system of claim 1, wherein the housing comprises a trackpad configured to receive a touch input during the rotation of the input tool.

8. The computing device system of claim 1, wherein:
the computing device comprises a display screen; and
the computing device performs a scrolling function, a zoom function, or a size adjustment function to information on the display screen in response to the rotation of the input tool.

9. The computing device system of claim 1, further comprising a counter-roller positioned in the housing and in contact with the input tool, wherein the counter-roller is configured to prevent the input tool from translating along a direction perpendicular to the longitudinal axis of the input tool.

10. A computing input device system, comprising:
an input tool having a first end and a second end separated by an elongated body, wherein the elongated body includes a rounded outer surface; and
a computing device having an upper housing, a lower housing, a processor, and a memory device, wherein the upper housing includes a display screen and the lower housing defines a recess configured to receive the input tool;

wherein the memory device includes electronic instructions encoded thereon that, when executed by the processor, cause the processor to perform a function on information on the display screen in response to determining that the input tool has rotated within the recess or an object has moved relative to the input tool, wherein the determining is based on detection of a force applied to a touch sensitive portion of the input tool.

11. The computing input device system of claim 10, wherein the elongated body includes a touch sensitive portion, and wherein the processor is configured to determine rotation of the input tool via detection of a force applied to the touch sensitive portion.

12. The computing input device system of claim 11, wherein:
the touch sensitive portion is configured to track a first position and a second position of a user object relative to the rounded outer surface and to determine a circumferential distance defined by the first position and the second position; and
an effect of the function is dependent on the circumferential distance.

13. The computing input device system of claim 11, wherein the touch sensitive portion extends along the elongated body between the first end and the second end, and wherein the first end and the second end are each touch sensitive.

14. The computing input device system of claim 11, wherein the elongated body includes a switch, and wherein the electronic instructions, when executed by the processor, cause the processor to perform a second function different from the function in response to an activation of the switch.

15. The computing input device system of claim 10, wherein:
the function includes a first scrolling function, a first zoom function, or a first size adjustment function;
the lower housing comprises a track pad configured to receive a touch input; and
the electronic instructions, when executed by the processor, further cause the processor to, in response to the touch input, perform, to the information on the display screen, a second scrolling function, a second zoom function, or a second size adjustment function.

16. A user interface device, comprising:
a computing device having a housing, wherein the housing defines a recess and includes a trackpad adjacent to the recess; and
an input tool having a touch sensitive portion, the input tool being positioned within the recess;
wherein the touch sensitive portion is configured to receive a rotational input from a user object, and the trackpad is configured to receive a sliding input from the user object.

17. The user interface device of claim 16, wherein:
the rotational input is an extension of the sliding input; and
the computing device performs a function to information on a display screen of the computing device in response to the sliding input and in response to the rotational input.

18. The user interface device of claim 16, wherein:
the sliding input is an extension of the rotational input; and
the computing device performs a function to information on a display screen of the computing device in response to the rotational input and in response to the sliding input.

19. The user interface device of claim 16, further comprising a measurement device configured to determine a property of angular displacement of the input tool during the rotational input.

20. The user interface device of claim 19, wherein the computing device performs a scrolling function, a zoom function, or a size adjustment function to information on a display screen of the computing device proportional to the property of angular displacement.

* * * * *